US009726373B2

(12) United States Patent
Nakayama et al.

(10) Patent No.: US 9,726,373 B2
(45) Date of Patent: Aug. 8, 2017

(54) HEAT STORAGE TYPE WASTE GAS PURIFICATION APPARATUS

(71) Applicant: SINTOKOGIO, LTD., Nagoya-shi, Aichi (JP)

(72) Inventors: Katsuya Nakayama, Aichi (JP); Atsushi Hata, Toyokawa (JP); Shigeki Fujita, Kitanagoya (JP); Yi Cheng, Aichi (JP); Teruhiko Ozaki, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 435 days.

(21) Appl. No.: 14/413,970

(22) PCT Filed: Dec. 26, 2013

(86) PCT No.: PCT/JP2013/084935
§ 371 (c)(1),
(2) Date: Jan. 9, 2015

(87) PCT Pub. No.: WO2014/155889
PCT Pub. Date: Oct. 2, 2014

(65) Prior Publication Data
US 2015/0159865 A1 Jun. 11, 2015

(30) Foreign Application Priority Data
Mar. 25, 2013 (JP) .................. 2013-061751

(51) Int. Cl.
*F23G 7/06* (2006.01)
*F23M 20/00* (2014.01)
*F23M 9/06* (2006.01)

(52) U.S. Cl.
CPC .............. *F23G 7/06* (2013.01); *F23G 7/068* (2013.01); *F23M 9/06* (2013.01); *F23M 20/005* (2015.01);
(Continued)

(58) Field of Classification Search
CPC ........ F23G 7/06; F23G 7/068; F23G 2206/00; F23G 2209/14; F23N 2037/20;
(Continued)

(56) References Cited

U.S. PATENT DOCUMENTS 5,837,205 A * 11/1998 Bayer .................... B01D 53/72
110/190
6,086,828 A * 7/2000 Thompson ........... B01D 53/343
110/212
(Continued)

FOREIGN PATENT DOCUMENTS

CN 102498345 A 6/2012
CN 102720527 A 10/2012
(Continued)

OTHER PUBLICATIONS

International Search Report in corresponding International Application No. PCT/JP2013/084935, dated Feb. 4, 2014, 2 pages.
(Continued)

Primary Examiner — David J Laux
(74) Attorney, Agent, or Firm — Brinks Gilson & Lione

(57) ABSTRACT

Disclosed is a heat storage type waste gas purification apparatus which comprises: a combustion chamber configured to combust and decompose a component contained in waste gas; a plurality of heat storage chambers each having one end communicating with the combustion chamber and each comprising a heat storage body; a plurality of supply inlets each equipped with an on-off valve and each provided at the other end of a respective one of the heat storage chambers to selectively supply waste gas thereto; a plurality of discharge outlets each equipped with an on-off valve and each provided at the other end of a respective one of the heat storage chambers to selectively discharge treated waste gas therefrom; a discharge passage connected to the discharge outlets to discharge the treated waste gas to an outside of the
(Continued)

apparatus therethrough; a plurality of bypass passages each connecting between the combustion chamber and the discharge passage, wherein each of the bypass passages is connected to the combustion chamber at a position directly above a respective one of the heat storage chambers, and equipped with an on-off valve; and a control section operable, when a temperature of one of the heat storage chambers becomes equal to or greater than a given value, to open one or more of the on-off valves of the bypass passages so as to discharge a part of waste gas in the combustion chamber via the opened one or more bypass passages.

12 Claims, 13 Drawing Sheets

(52) U.S. Cl.
 CPC ...... *F23G 2206/00* (2013.01); *F23G 2209/14* (2013.01); *F23N 2037/20* (2013.01)
(58) Field of Classification Search
 CPC ......... F28D 20/00; F28D 20/02; Y02E 60/14; Y02E 60/142; Y02E 60/145
 See application file for complete search history.

(56) References Cited

U.S. PATENT DOCUMENTS

| | | | |
|---|---|---|---|
| 6,666,911 B2* | 12/2003 | Chou | B01D 53/06 96/123 |
| 2013/0025254 A1* | 1/2013 | Kurosaka | F02C 3/205 60/39.24 |

FOREIGN PATENT DOCUMENTS

| | | |
|---|---|---|
| EP | 0 464 586 A1 | 1/1992 |
| JP | 2003-240223 A | 8/2003 |
| JP | 2003-287215 A | 10/2003 |
| JP | 2004-77017 A | 3/2004 |
| JP | 3112831 U | 8/2005 |
| JP | 2007-205609 A | 8/2007 |
| JP | 2007-247922 A | 9/2007 |
| WO | WO 2013/031370 A1 | 3/2013 |

OTHER PUBLICATIONS

Extended Search Report in corresponding European Application No. 13880096.6 dated Feb. 2, 2016, 6 pages.

* cited by examiner

FIG.5
(a) 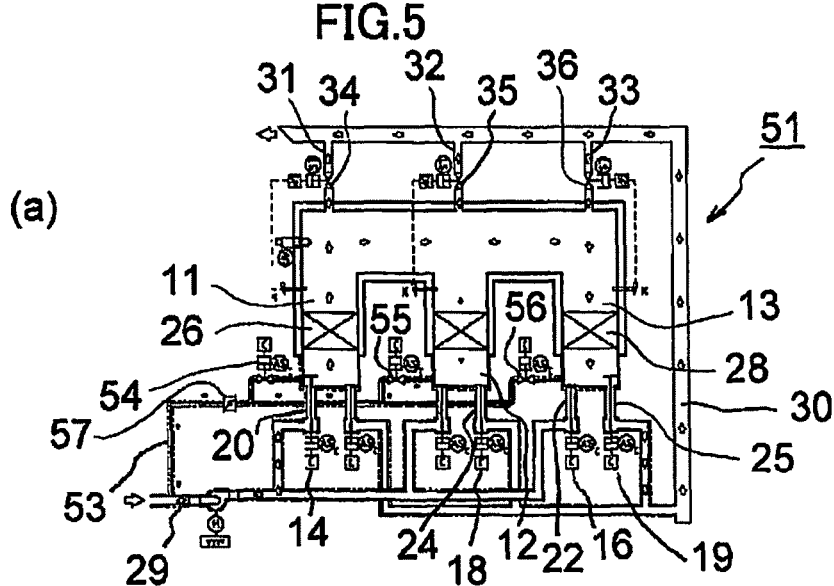
(b) 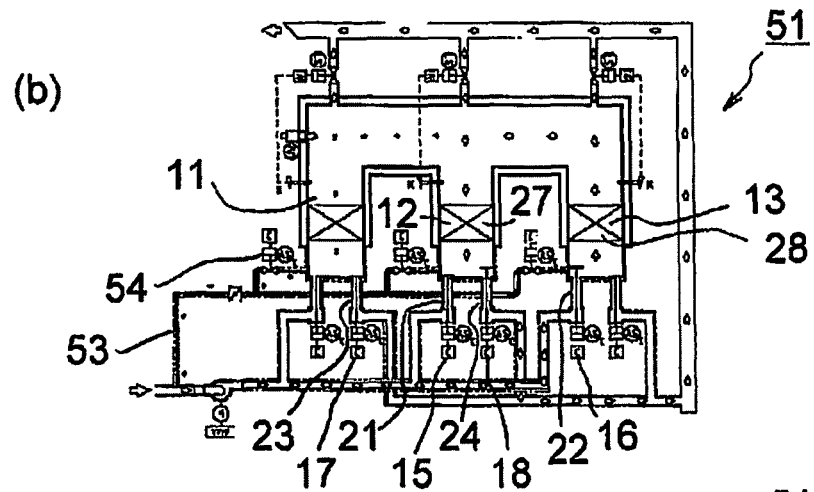
(c) 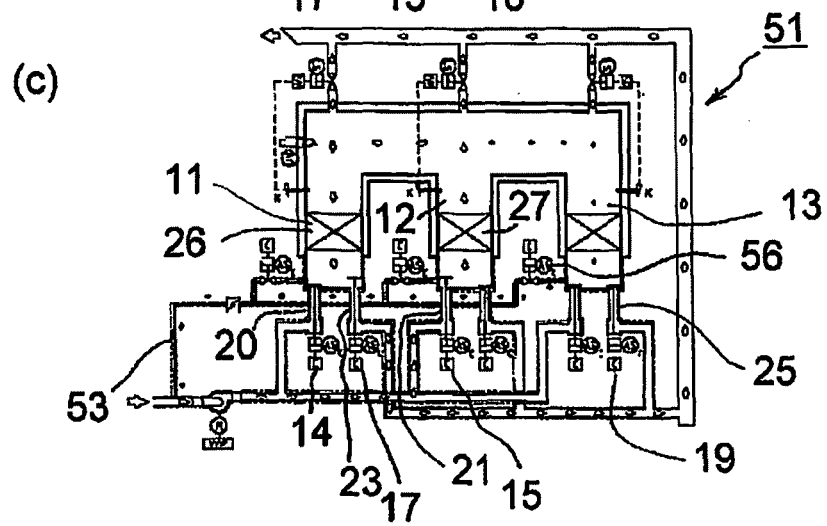

HEAT STORAGE TYPE WASTE GAS PURIFICATION APPARATUS

This application is a 371 application of PCT/JP2013/084935 having an international filing date of Dec. 26, 2013, which claims priority to JP2013-061751 filed Mar. 25, 2013, the entire contents of which are incorporated herein by reference.

TECHNICAL FIELD

The present invention relates to a heat storage type waste gas purification apparatus, and more particularly to a heat storage type waste gas purification apparatus for purifying or treating waste gas by use of a heat storage body.

BACKGROUND ART

Heretofore, in order to purify or treat waste gas containing combustible harmful substances such as volatile organic compounds (VOC) generated in facilities of the bonding industries (laminated package, adhesive tape, etc.), facilities of the printing industries (gravure printing, offset printing, etc.), painting facilities, chemical factories, facilities of electronics/ceramics industries, industrial cleaning facilities and others, a waste gas purification apparatus as described, for example, in the following Patent Document 1, has been used.

For example, such a waste gas purification apparatus comprises: a plurality of heat storage chambers each provided with a heat storage body and a set of a supply port and a discharge port equipped, respectively, with a supply valve and a discharge valve; and a combustion chamber communicating with an upper end of each of the heat storage chambers. This waste gas purification apparatus is configured to be operated while switching between two different combinations of a supply side to which untreated gas is supplied and a discharge side from which treated gas is discharged, in the heat storage chambers, by controlling the supply and discharge valves, thereby performing a waste gas purification treatment.

CITATION LIST

Patent Document

Patent Document 1: JP 2004-77017 A

SUMMARY OF THE INVENTION

Technical Problem

However, in the conventional waste gas purification apparatus, if an internal temperature of the apparatus becomes excessively high, the apparatus is likely to be damaged. Thus, there arises a situation where it is necessary to release surplus heat from the apparatus during apparatus operation. In this case, there is a problem that, when surplus heat is released during treatment of silicone-containing waste gas, silica powder is deposited in a certain one of the plurality of the heat storage chambers, in an imbalanced or lopsided manner. There is another problem that the lopsided deposition of silica powder causes imbalance in heat storage amount between the heat storage chambers, and thereby the waste gas can be led to the combustion chamber without being sufficiently heated up.

The present invention has been made to solve the above problems in the conventional technique, and an object thereof is to provide a heat storage type waste gas purification apparatus capable of reliably preventing lopsided deposition of silica powder or the like, while avoiding damage to the apparatus.

Solution to Technical Problem

In order to achieve the above object, according to a first aspect of the present invention, there is provided a heat storage type waste gas purification apparatus which comprises: a combustion chamber configured to combust and decompose a component contained in waste gas; a plurality of heat storage chambers each having one end communicating with the combustion chamber and each comprising a heat storage body; a plurality of supply inlets each equipped with an on-off valve and each provided at the other end of a respective one of the heat storage chambers to selectively supply waste gas thereto; a plurality of discharge outlets each equipped with an on-off valve and each provided at the other end of a respective one of the heat storage chambers to selectively discharge treated waste gas therefrom; a discharge passage connected to the discharge outlets to discharge the treated waste gas to an outside of the apparatus therethrough; a plurality of bypass passages each connecting between the combustion chamber and the discharge passage, wherein each of the bypass passages is connected to the combustion chamber at a position directly above a respective one of the heat storage chambers, and equipped with an on-off valve; and a bypass passage control section operable, when a temperature of one of the heat storage chambers becomes equal to or greater than a given value, to open one or more of the on-off valves of the bypass passages so as to discharge a part of waste gas in the combustion chamber via the opened one or more bypass passages.

In the above heat storage type waste gas purification apparatus of the present invention, even in a situation where a temperature of the combustion chamber becomes excessively high due to a high concentration of waste gas or the like, the bypass passage control section operates to open one or more of the on-off valves of the bypass passages so as to discharge a part of waste gas in the combustion chamber via the opened one or more bypass passages. Therefore, the present invention makes it possible to avoid damage to the combustion chamber. In addition, each of the bypass passages is connected to the combustion chamber at a position directly above a respective one of the heat storage chambers, and equipped with an on-off valve, so that it becomes possible to equalize a flow rate of waste gas flowing into each of the heat storage bodies to thereby prevent lopsided silica deposition.

Preferably, in the heat storage type waste gas purification apparatus of the present invention, each of the bypass passages is connected to a top portion of the combustion chamber.

According to this feature, each of the bypass passages is connected to a top portion of the combustion chamber, so that it becomes possible to smoothly discharge waste gas in the combustion chamber to the bypass passage without guiding the waste gas against a flow direction thereof.

In the heat storage type waste gas purification apparatus of the present invention, when the heat storage chambers includes a first heat storage chamber and a second heat storage chamber adjacent to the first heat storage chamber, the heat storage type waste gas purification apparatus preferably further comprises an agitation device provided in an internal space of the combustion chamber at a position between a region of the internal space just above the first heat storage chamber and a region of the internal space just above the second heat storage chamber, and configured to agitate waste gas in the combustion chamber.

According to this feature, the agitation device configured to agitate waste gas in the combustion chamber is provided in the internal space of the combustion chamber at a position between respective regions of the internal space just above the adjacent heat storage chambers, so that it becomes possible to extend a retention time of untreated waste gas in the combustion chamber to thereby further enhance decomposition efficiency of waste gas components.

Preferably, the heat storage type waste gas purification apparatus of the present invention further comprises: a supply passage connected to the supply inlets; a blower provided in the supply passage and configured to supply waste gas to the supply inlets; a return passage connecting between the discharge passage and a region of the supply passage located upstream of the blower, to return treated waste gas in the discharge passage to the supply passage therethrough; and a flow rate adjusting mechanism configured to adjust a flow rate of treated waste gas to be permitted to flow into the return passage.

According to this feature, it is possible to suppress static pressure fluctuation which would otherwise occur in the apparatus during opening and closing of the on-off valves of the supply inlets and the discharge outlets. This makes it possible to prevent a volume of untreated waste gas flowing from a target facility into the apparatus, and a volume of treated waste gas discharged via the discharge passage, from increasing due to the static pressure fluctuation.

Preferably, in the above heat storage type waste gas purification apparatus, the flow rate adjusting mechanism is a three-way valve provided in the discharge passage at a connection point with the return passage and configured to adjust a flow rate of treated waste gas to be permitted to flow from the discharge passage into the return passage to thereby adjust a flow rate of treated waste gas to be permitted to flow into the return passage.

Preferably, in the above heat storage type waste gas purification apparatus, the flow rate adjusting mechanism is an adjusting valve provided in the discharge passage at a downstream position with respect to a connection point with the return passage and configured to adjust a flow rate of treated waste gas to be permitted to flow through a region of the discharge passage downstream of the connection point to thereby adjust a flow rate of treated waste gas to be permitted to flow into the return passage.

Preferably, in the above heat storage type waste gas purification apparatus, the flow rate adjusting mechanism is an adjusting valve provided in the return passage and configured to adjust a flow rate of treated waste gas to be permitted to pass through the return passage.

Preferably, the above heat storage type waste gas purification apparatus further comprises: a flow rate detection section configured to detect a flow rate of waste gas supplied from the blower toward the supply inlet; and a flow rate adjusting mechanism control section operable, based on a result of the detection by the flow rate detection section, to control the flow rate adjusting mechanism to adjust a flow rate of treated waste gas to be permitted to flow into the return passage.

According to this feature, it is possible to suppress static pressure fluctuation which would otherwise occur in the apparatus during opening and closing of the on-off valves of the supply inlets and the discharge outlets. This makes it possible to prevent a volume of untreated waste gas flowing from a target facility into the apparatus, and a volume of treated waste gas discharged via the discharge passage, from increasing due to the static pressure fluctuation.

Preferably, the above heat storage type waste gas purification apparatus further comprises: a pressure detection section configured to detect a pressure in the supply passage at a position downstream of a connecting position with the return passage and upstream of the blower; and a flow rate adjusting mechanism control section operable, based on a result of the detection by the pressure detection section, to control the flow rate adjusting mechanism to adjust a flow rate of treated waste gas to be permitted to flow into the return passage.

According to this feature, it is possible to suppress static pressure fluctuation which would otherwise occur in the apparatus during opening and closing of the on-off valves of the supply inlets and the discharge outlets. This makes it possible to prevent a volume of untreated waste gas flowing from a target facility into the apparatus, and a volume of treated waste gas discharged via the discharge passage, from increasing due to the static pressure fluctuation.

Preferably, the above heat storage type waste gas purification apparatus further comprises: a flow rate detection section configured to detect a flow rate of waste gas supplied from the blower toward the supply inlet; a pressure detection section configured to detect a pressure in the supply passage at a position downstream of a connecting position with the return passage and upstream of the blower; and a flow rate adjusting mechanism control section operable, based on results of the respective detections by the flow rate detection section and the pressure detection section, to control the flow rate adjusting mechanism to adjust a flow rate of treated waste gas to be permitted to flow into the return passage.

According to this feature, it is possible to suppress static pressure fluctuation which would otherwise occur in the apparatus during opening and closing of the on-off valves of the supply inlets and the discharge outlets. This makes it possible to prevent a volume of untreated waste gas flowing from a target facility into the apparatus, and a volume of treated waste gas discharged via the discharge passage, from increasing due to the static pressure fluctuation.

Preferably, in the above heat storage type waste gas purification apparatus, each of the on-off valves of the supply inlets and the on-off valves of the discharge outlets comprises: a flow port-defining member formed with a flow port for waste gas to be supplied or discharged therethrough; a valve element movable in directions causing the valve element to come close to and away from the flow port-defining member, wherein the valve element is configured to be brought into contact with the flow port-defining member to thereby close the flow port, and then separated away from the flow port-defining member to thereby open the flow port; and an air cylinder configured to drive the valve element in the directions causing the contact and the separation with respect to the flow port-defining member, and wherein the heat storage type waste gas purification apparatus further comprises a common silencer tank to which a plurality of exhaust lines each configured to exhaust driving air for a respective one of the air cylinders of the on-off valves of the supply inlets and the discharge outlets are connected in a merged manner, wherein the silencer tank is disposed within a noise insulation device.

According to this feature, exhaust noise of the air cylinders for the on-off valves can be suppressed with further enhanced efficiency. In addition, the silencer tank for the air cylinders is disposed within the noise insulation device, so that it becomes possible to doubly suppress the exhaust noise from the air cylinder exhaust lines. Further, the silencer tank is common to all of the air cylinder exhaust lines, so that there is no need to provide a silencer tank for each on-off valve, i.e., for each air cylinder. Thus, it becomes possible to facilitate structural simplification.

Preferably, in the above heat storage type waste gas purification apparatus, the noise insulation device is provided in such a manner as to surround the blower.

According to this feature, a noise insulation device for the blower is additionally used as a noise insulation device for the on-off valve driving air cylinders, so that it becomes possible to eliminate a need for providing a dedicated noise insulation device for the air cylinders.

According to a second aspect of the present invention, there is provided a heat storage type waste gas purification apparatus which comprises: a combustion chamber configured to combust and decompose a component contained in waste gas; a plurality of heat storage chambers each having one end communicating with the combustion chamber and each comprising a heat storage body; a plurality of supply inlets each equipped with an on-off valve and each provided at the other end of a respective one of the heat storage chambers to selectively supply waste gas thereto; a plurality of discharge outlets each equipped with an on-off valve and each provided at the other end of a respective one of the heat storage chambers to selectively discharge treated waste gas therefrom; and a discharge passage connected to the discharge outlets to discharge the treated waste gas to an outside of the apparatus therethrough, wherein the heat storage chambers includes a first heat storage chamber and a second heat storage chamber, and wherein the heat storage type waste gas purification apparatus further comprises an agitation device provided in an internal space of the combustion chamber at a position between a region of the internal space just above the first heat storage chamber and a region of the internal space just above the second heat storage chamber, and configured to agitate waste gas in the combustion chamber.

Effect of the Invention

The heat storage type waste gas purification apparatus of the present invention is capable of reliably preventing lopsided deposition of silica powder or the like, while avoiding damage to the apparatus.

BRIEF DESCRIPTION OF THE DRAWINGS

FIGS. 5(a), 5(b) and 5(c) illustrate steps of a waste gas purification process using the heat storage type waste gas purification apparatus illustrated in FIG. 4.

FIGS. 6(a) and 6(b) illustrate two heat storage type waste gas purification apparatuses each comprising an agitation device, as yet another modification of the heat storage type waste gas purification apparatus in FIG. 1, wherein FIG. 6(a) is a schematic diagram illustrating a two-tower, heat storage type waste gas purification apparatus, and FIG. 6(b) is a schematic diagram illustrating a three-tower, heat storage type waste gas purification apparatus.

FIGS. 7(a), 7(b), 7(c) and 7(d) illustrate structures of the agitation devices comprised in the respective heat storage type waste gas purification apparatuses in FIGS. 6(a)-6(b), wherein: FIG. 7(a) and FIG. 7(b) are, respectively, a sectional view taken along the line A1-A1, A2-A2 or A3-A3 in FIGS. 6(a)-6(b) and 8(a)-8(b), and a sectional view taken along the line A4-A4 in FIG. 7(a); and FIG. 7(c) and FIG. 7(d) are, respectively, a sectional view illustrating an agitation device as a comparative example, taken along the same line as that in FIG. 7(a), and a sectional view taken along the line A5-A5 in FIG. 7(c).

FIGS. 8(a) and 8(b) illustrate two heat storage type waste gas purification apparatuses as one modification of the heat storage type waste gas purification apparatus in FIGS. 6(a)-6(b), wherein FIG. 8(a) is a schematic diagram illustrating a two-tower, heat storage type waste gas purification apparatus, and FIG. 8(b) is a schematic diagram illustrating a three-tower, heat storage type waste gas purification apparatus.

DETAILED DESCRIPTION OF THE PREFERRED EMBODIMENTS

With reference to the drawings, a heat storage type waste gas purification apparatus according to one embodiment of the present invention will now be described. The heat storage type waste gas purification apparatus 1 according to this embodiment is suitable for a treatment of waste gas containing a combustible and oxidizable component such as volatile organic compounds, or the like. The heat storage type waste gas purification apparatus 1 is also suitable for a treatment of waste gas containing silicone in large amounts. The typical example of the heat storage type waste gas purification apparatus 1 is a RTO (Regenerative Thermal Oxidizer).

Figure 1:
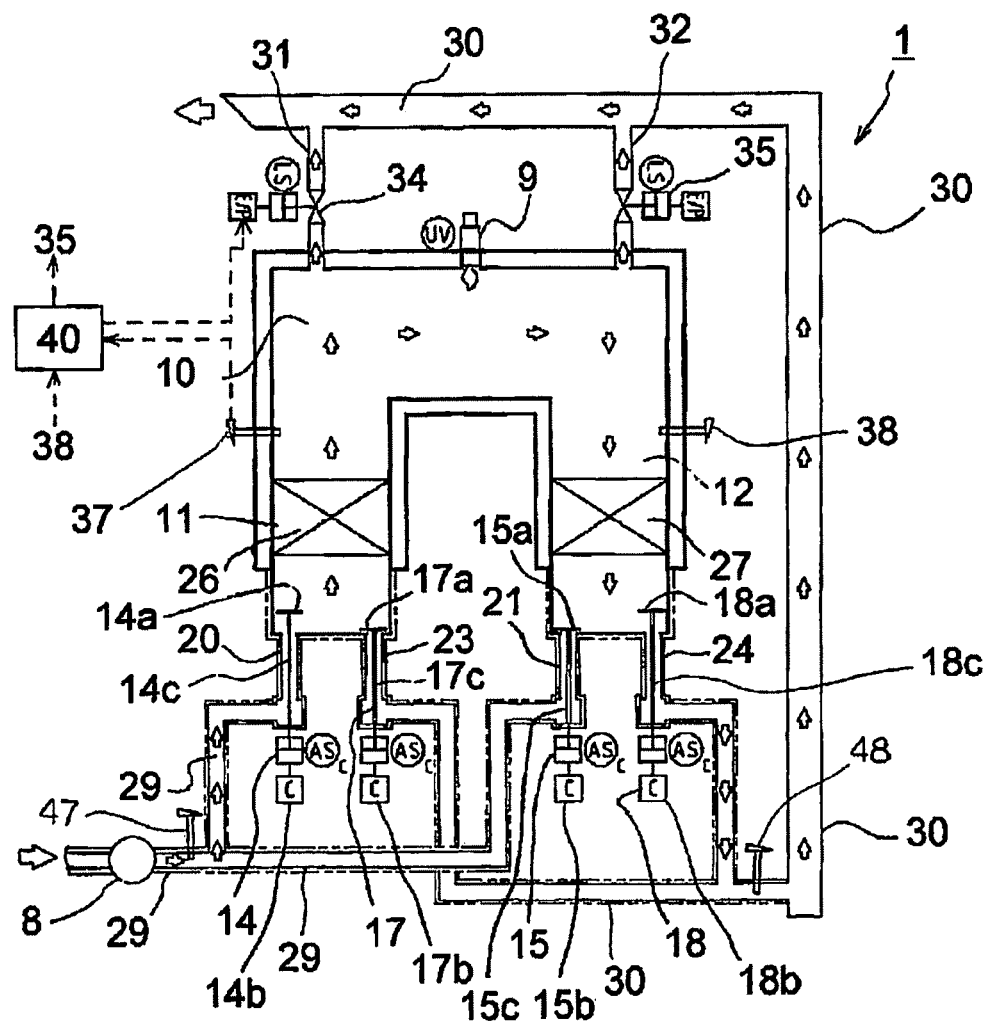
FIG. 1 is a schematic diagram illustrating a heat storage type waste gas purification apparatus according to one embodiment of the present invention.

As illustrated in FIG. 1, the heat storage type waste gas purification apparatus 1 comprises a combustion chamber 10 provided with a burner 9, and a pair of first and second heat storage chambers 11, 12 each having one, first, end (upper end) coupled to the combustion chamber 10 in communicating relation with each other. In FIG. 1, the arrows indicate a flow of waste gas.

The heat storage type waste gas purification apparatus 1 further comprises: first and second supply ports 20, 21 each equipped with a respective one of two supply on-off valves 14, 15 and each provided at the other, second, end (lower end) of a respective one of the first and second heat storage chambers 11, 12 to selectively supply untreated gas thereto; and first and second discharge ports 23, 24 each equipped with a respective one of two discharge on-off valves 17, 18 and each provided at the second end (lower end) of a respective one of the first and second heat storage chambers 11, 12 to selectively discharge treated gas herefrom.

The heat storage type waste gas purification apparatus 1 further comprises first and second heat storage bodies 26, 27 each provided between the first end (upper end) and the second end (lower end) of a respective one of the plurality of first and second heat storage chambers 11, 12. Each of the first and second heat storage bodies 26, 27 is formed by arranging a plurality of ceramic members each having a plurality of through-holes, in adjacent relation to each other.

The heat storage type waste gas purification apparatus 1 further comprises a discharge duct 30 connected to the first and second discharge ports 23, 24. The discharge duct 30 is a passage for guiding and discharging treated gas from the heat storage type waste gas purification apparatus 1 to a given location.

The heat storage type waste gas purification apparatus 1 further comprises a supply duct 29 connected to the first and second supply ports 20, 21. The supply duct 29 is a passage for supplying untreated gas into the heat storage type waste gas purification apparatus 1. The supply duct 29 is provided with a blower 8. The blower 8 is operable to direct untreated gas to the first and second supply ports 20, 21 and thus to the combustion chamber 10 via a selected one of the first and second heat storage chambers 11, 12. The blower 8 is also operable to direct treated gas to the give discharge location via a selected one of the first and second discharge ports 23, 24 and the discharge duct 30.

The heat storage type waste gas purification apparatus 1 further comprises a plurality of bypass passages 31, 32 each connected to the combustion chamber 10. Each of the first and second bypass passages 31, 32 communicates or connects between the combustion chamber 10 and the discharge duct 30. Each of the first and second bypass passages 31, 32 is connected to the combustion chamber 10 at a position directly above a respective one of the first and second heat storage chambers 11, 12, and equipped with a respective one of two bypass on-off valves 34, 35. Further, each of the first and second bypass passages 31, 32 is connected to a top portion (top wall) of the combustion chamber 10.

Although the first and second bypass passages 31, 32 in this embodiment are connected to the top wall, the present invention is not limited thereto. That is, each of the first and second bypass passages may be connected to a sidewall of the combustion chamber 10 at a position directly above a respective one of the first and second heat storage chambers 11, 12. However, connecting to the top wall is more advantageous in terms of gas flow (in terms of being able to discharge gas without guiding the gas against a gas flow direction). Further, each of the first and second bypass passages may be disposed in the vicinity of a center of a respective one of the first and second heat storage chambers 11, 12, when viewed from thereabove. This is more advantageous in terms of gas flow (in terms of being able to discharge gas without guiding the gas against a gas flow direction).

The heat storage type waste gas purification apparatus 1 further comprises first and second temperature detectors 37, 38 each provided in the vicinity of the upper end of a respective one of the first and second heat storage chambers 11, 12, and a control section 40. The first temperature detector 37 is configured to detect a temperature of a region just above the first heat storage chamber 11. The second temperature detector 38 is configured to detect a temperature of a region just above the second heat storage chamber 12. The control section 40 is operable, based on temperature information from the first and second temperature detectors 37, 38, to control the on-off valves 34, 35 to release surplus heat. The on-off valves 34, 35 and the first and second bypass passages 31, 32 make it possible to release surplus heat to thereby avoid damage to the combustion chamber 10 due to a rapid increase in internal temperature thereof. The control section 40 is also operable to control an open/closed state of each of the on-off valves 14, 15, 17, 18.

The above heat storage type waste gas purification apparatus 1 is designed to prevent lopsided deposition of silica powder, while releasing surplus heat. This point will be described using a heat storage type waste gas purification apparatus 301 illustrated in FIG. 2 as a comparative example.

Figure 2:
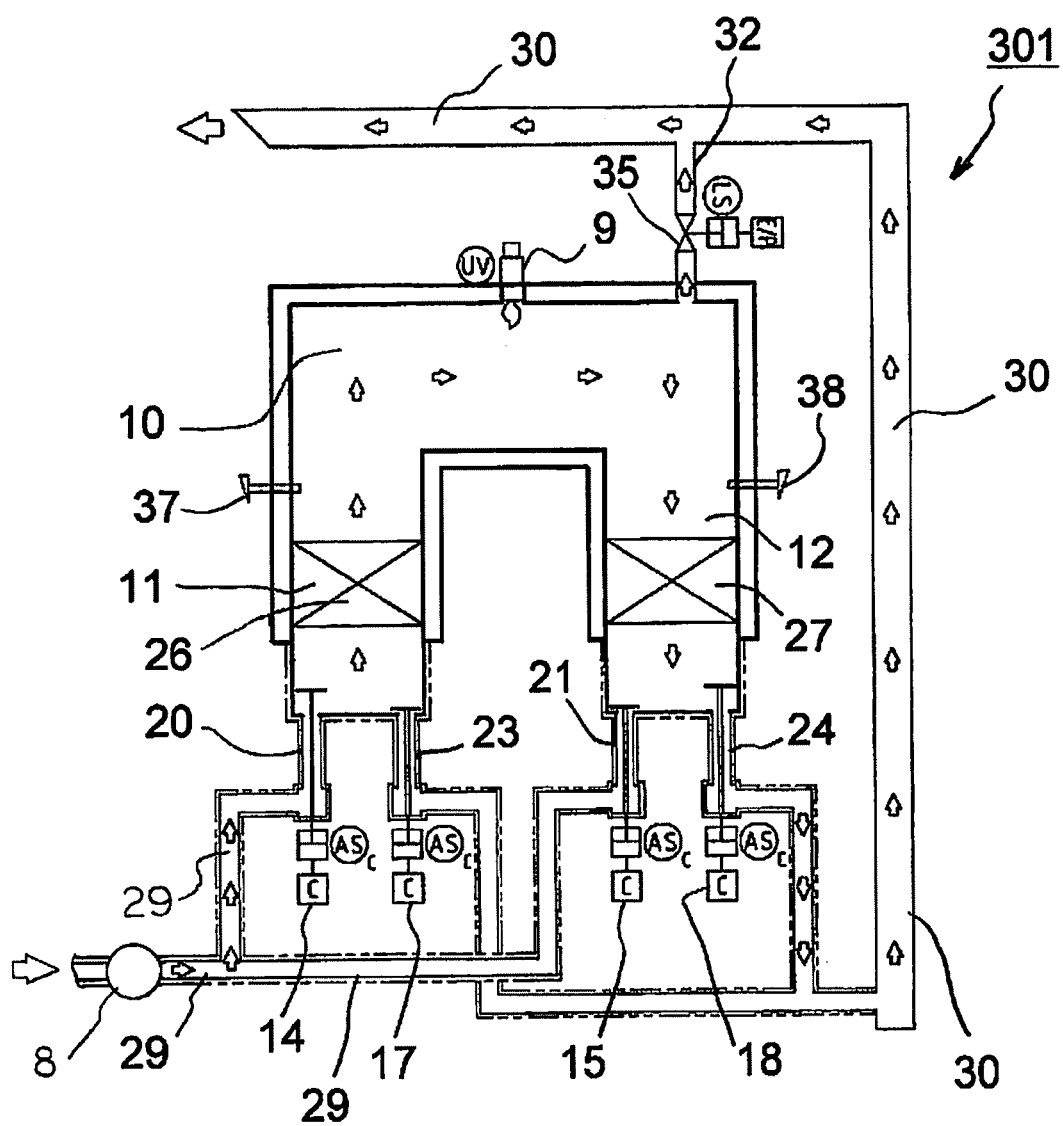
FIG. 2 is a schematic diagram illustrating a heat storage type waste gas purification apparatus as a comparative example with respect to the heat storage type waste gas purification apparatus in FIG. 1.

As illustrated in FIG. 2, the heat storage type waste gas purification apparatus 301 as a comparative example has the same configuration as that of the heat storage type waste gas purification apparatus 1 in FIG. 1, except that the apparatus 301 is devoid of the first bypass passage 31 and the on-off valve 34. That is, the apparatus 301 has just the second bypass passage 32 located directly above the heat second storage chamber 12, and equipped with the on-off valve 35.

The apparatus 301 in FIG. 2 is configured to, when an internal temperature of the combustion chamber 10 becomes excessively high, open the on-off valve 35 to thereby release surplus heat via the second bypass passage 32. In this case, a flow rate of gas flowing from the combustion chamber 10 into the second heat storage chamber 12 disposed directly below the second bypass passage 32 becomes less than a flow rate of gas flowing from the combustion chamber 10 into the first heat storage chamber 11. A decrease in flow rate of gas flowing into the second heat storage chamber 12 means a decrease in flow speed of gas passing through the second heat storage body 27. In the case where waste gas contains silicone (in a gaseous state), the decrease in gas flow speed during the passing leads to a situation where silica is more likely to be deposited in the second heat storage chamber 12. As a result, silica powder will be lopsidedly deposited in the second heat storage chamber 12, as compared to the first heat storage chamber 11.

There is another problem that, after switching between two different combinations of a supply side to which untreated gas is supplied and a discharge side to which untreated gas is supplied, in the first and second heat storage chambers 11, 12, a heat storage amount in the second heat storage body 27 of the second heat storage chamber 12 becomes insufficient. When a heat storage amount in the second heat storage chamber 12 switched to the supply side becomes insufficient, silicone contained in waste gas flowing into the second heat storage chamber 12 is more likely to adhere to the second heat storage body 27. As above, silicone is more likely to adhere to the second heat storage body 27 of the second heat storage chamber 12 in a tar-like viscous state, which can pose a risk of clogging of the gas-passing through-holes of the second heat storage body 27. Moreover, the second heat storage body 27 having the clogged through-holes involves a problem that a heat storage function is deteriorated, resulting in failing to sufficiently perform waste gas heat recovery. This accelerates adhesion of silicone, causing a vicious cycle. Further, depending on a control method of switching between the two different combinations of the supply side and the discharge side in the first and second heat storage chambers 11, 12, a temperature difference between the first and second heat storage chambers 11, 12 is likely to occur, causing an unevenness of temperature distribution in the combustion chamber 10.

Specifically, it is conceivable to perform a normal control action to detect respective temperatures of the first and second heat storage chambers 11, 12, and, based on an average value of the detected temperatures, switch the on-off valves 14, 15, 17, 18. It is also conceivable to perform a bypass control action to, based on the average value of the detected temperatures, switch the on-off valve 35 of the second bypass passage 32. However, even in a situation where the temperature of the second heat storage chamber 12 becomes lower for the aforementioned reasons, when the temperature of the first heat storage chamber 11 is sufficiently high, the apparatus operation can be determined to be normal, and therefore the normal control action will be continued. This causes a problem that a temperature difference between the first heat storage chamber 11 and the second heat storage chamber 12 becomes larger. Moreover, the temperature difference causes an unevenness of temperature distribution in the combustion chamber 10.

In contrast to the apparatus 301 in FIG. 2, the heat storage type waste gas purification apparatus 1 described based on FIG. 1 has the first and second bypass passages 31, 32 provided correspondingly to the first and second heat storage chambers 11, 12, so that it becomes possible to equalize a flow rate of gas flowing into each of the first and second heat storage bodies 26, 27. Thus, the apparatus 1 can prevent lopsided silica deposition which would otherwise occur in the apparatus 301. It also becomes possible to prevent the occurrence of various problems due to the lopsided silica deposition (such as "clogging of the through-holes of the heat storage body", "insufficient heat recovery", "increase in temperature difference between the first and second heat storage chambers 11, 12", and "unevenness of temperature distribution in the combustion chamber 10"). Accordingly, there are an advantage of being able to extend a usable life of the heat storage body, and an advantage of being able to provide an even temperature distribution in the combustion chamber to thereby enhance decomposition efficiency of waste gas components.

In the apparatus 1, the control section 40 may be configured to perform PID (Proportional Integral Derivative) control. For example, the P value, the I value and the D value are set, respectively, in the range of 0 to 50%, in the range of 0 to 200 sec and in the range of 0 to 100 sec. The PID control makes it possible to realize efficient apparatus operation. Further, the prevention of the lopsided silica deposition eventually realizes high decomposition efficiency of VOC.

Each of the on-off valves 14, 15 of the first and second supply ports 20, 21 and the on-off valves 17, 18 of the first and second discharge ports 23, 24 is composed of a called "poppet damper" (poppet valve), and they are used for changing a gas flow direction. Each of the on-off valves 14, 15, 17, 18 comprises a valve element (14a, 15a, 17a, 18a) and a cylinder (14b, 15b, 17b, 18b). Each of the valve elements 14a, 15a, 17a, 18a is configured to be movable in a vertical direction. Specifically, each of the valve elements 14a, 15a, 17a, 18a is attached to a distal end of a rod (14c, 15c, 17c, 18c) of the cylinder (14b, 15b, 17b, 18b), and movable according to extending and retracting of the rod (14c, 15c, 17c, 18c).

The apparatus 1 is operated while switching the above on-off valves 14, 15, 17, 18 every time a given time elapses, to switch between the two different combinations of the supply side (to which untreated gas is supplied) and the discharge side (from which treated gas is discharged), in the first and second heat storage chambers 11, 12. A timing of the switching of the supply and discharge on-off valves may be determined based on inlet and outlet temperatures (temperatures of supply gas and discharge gas measured, respectively, by a temperature detector 47 provided in the supply duct 29 and a temperature detector 48 provided in the discharge duct 30).

A waste gas purifying process using the above heat storage type waste gas purification apparatus 1 will be described below. The arrows in FIG. 1 indicate a flow of untreated gas inflowing via the supply on-off valve 14 in an open state and a flow of treated gas purified by the apparatus 1. The following description will be made on an assumption that the first heat storage chamber 11 and the second heat storage chamber 12 are initially set, respectively, as the supply side and the discharge side, as illustrated in FIG. 1. In this case, waste gas to be treated (untreated gas) reaches the first heat storage chamber 11 via the first supply port 20.

Then, when the waste gas passes through the first heat storage body 26 of the first heat storage chamber 11, it is heated by heat exchange with the first heat storage body 26. On the other hand, the first heat storage body 26 is cooled while releasing heat. Then, when the waste gas heated by the first heat storage body 26 reaches the combustion chamber 10, components contained therein are combusted and decomposed.

Subsequently, treated gas after the combustion passes through the second heat storage body 27 of the second heat storage chamber 12. In this process, the treated gas is cooled by heat exchange with the second heat storage body 27. On the other hand, the second heat storage body 27 stores heat therein. The cooled treated gas passes through the second discharge port 24 and reaches the discharge duct 30.

In FIG. 1, in order to explain a function of the first and second bypass passages 31, 32, the arrows are illustrated to indicate that treated gas is flowing via each of the on-off valves 34, 35 being in an open state. However, fundamentally, each of the on-off valves 34, 35 is in a closed state. That is, no gas flows through the first and second bypass passages 31, 32. Then, when an internal temperature of the apparatus 1 becomes excessively high due to an increase in concentration of waste gas supplied to the apparatus 1, or the like, surplus heat is released from the first and second bypass passages 31, 32, as necessary.

When the above apparatus operation is continued, the first heat storage body 26 of the first heat storage chamber 11 is cooled while releasing heat, and the second heat storage body 27 of the second heat storage chamber 12 is heated while storing heat therein. Thus, after elapse of a certain time, the on-off valve 14 of the first supply port 20 of the first heat storage chamber 11 is closed, and the on-off valve 17 of the first discharge port 22 of the first heat storage chamber 11 is opened. Simultaneously, the on-off valve 15 of the second supply port 21 of the second heat storage chamber 12 is opened, and the on-off valve 18 of the second discharge port 24 of the second heat storage chamber 12 is closed. As a result of this control action, a gas flow direction is reversed, i.e., the first heat storage chamber 11 and the second heat storage chamber 12 are switched, respectively, to the discharge side and the supply side.

Thus, waste gas to be subsequently treated can be heated by heat exchange with the second heat storage body 27 sufficiently storing heat therein. The heated waste gas is treated in the combustion chamber 10, and, after being cooled by heat exchange with the first heat storage body 26, discharged. Then, after elapse of a certain time, the on-off valve 14 of the first supply port 20 of the first heat storage chamber 11 is opened, and the on-off valve 17 of the first discharge port 23 of the first heat storage chamber 11 is closed. Simultaneously, the on-off valve 15 of the second supply port 21 of the second heat storage chamber 12 is closed, and the on-off valve 18 of the second discharge port 24 of the second heat storage chamber 12 is opened. As a result of this control action, as illustrated in FIG. 1, the gas flow direction is reversed, i.e., the first heat storage chamber 11 and the second heat storage chamber 12 are switched, respectively, to the supply side and the discharge side.

By continuously operating the apparatus while repeating the above control action at intervals of a certain time, it becomes possible to realize an efficient combustion treatment utilizing waste heat.

In the waste gas purifying process using the above heat storage type waste gas purification apparatus 1, when a temperature measured by one of the first and second temperature detectors 37, 38 is excessively high (is greater than a given value), the bypass on-off valve 34 and/or the bypass on-off valve 35 are switched to select a desired one of the first and second bypass passages 31, 32 so as to release surplus heat from the selected one bypass passage, or to release surplus heat from both of the bypass passages, for some situations. Thus, it becomes possible to prevent the lopsided silica deposition, and prevent the occurrence of various problems due to the lopsided silica deposition (such as "clogging of the through-holes of the heat storage body", "insufficient heat recovery", "increase in temperature difference between the first and second heat storage chambers 11, 12", and "unevenness of temperature distribution in the combustion chamber 10"), described based on FIG. 2. Further, the prevention of the lopsided silica deposition eventually realizes high decomposition efficiency of VOC.

Figure 3:
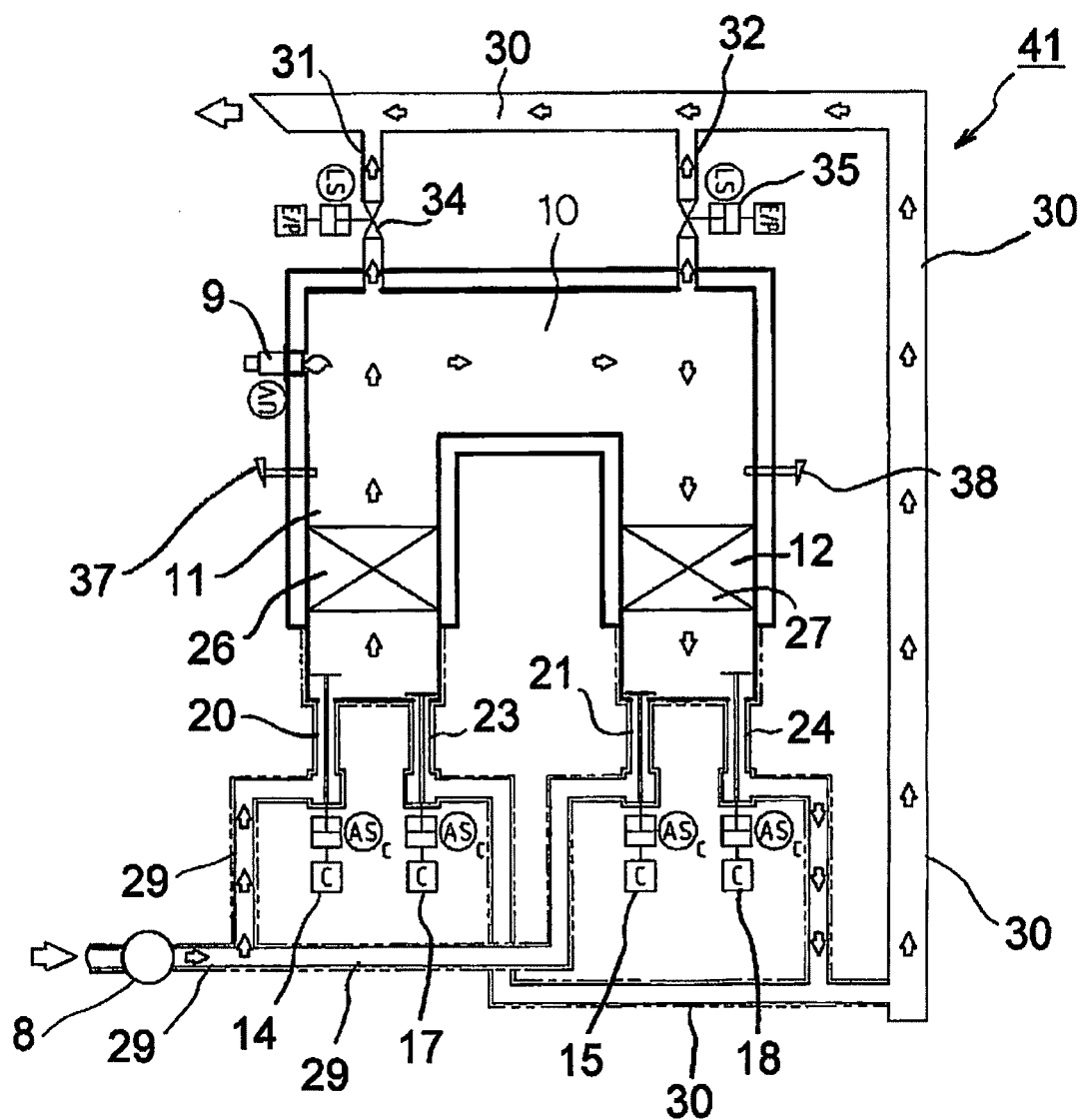
FIG. 3 is a schematic diagram illustrating a heat storage type waste gas purification apparatus as one modification of the heat storage type waste gas purification apparatus in FIG. 1.

In the apparatus 1, the burner 9 is provided in the top wall of the combustion chamber 10. Alternatively, the burner 9 may be provided in the sidewall of the combustion chamber 10, for example, as in a heat storage type waste gas purification apparatus 41 illustrated in FIG. 3. In this case, the same advantageous effects as those of the apparatus 1 can be obtained. Except for an installation position of the burner 9 with respect to the apparatus 1, the apparatus 41 has the same configuration as that of the apparatus 1 (in FIG. 3, the same element or component as that in FIG. 1 is assigned with the same reference sign). Thus, detailed description thereof will be omitted.

Figure 4:
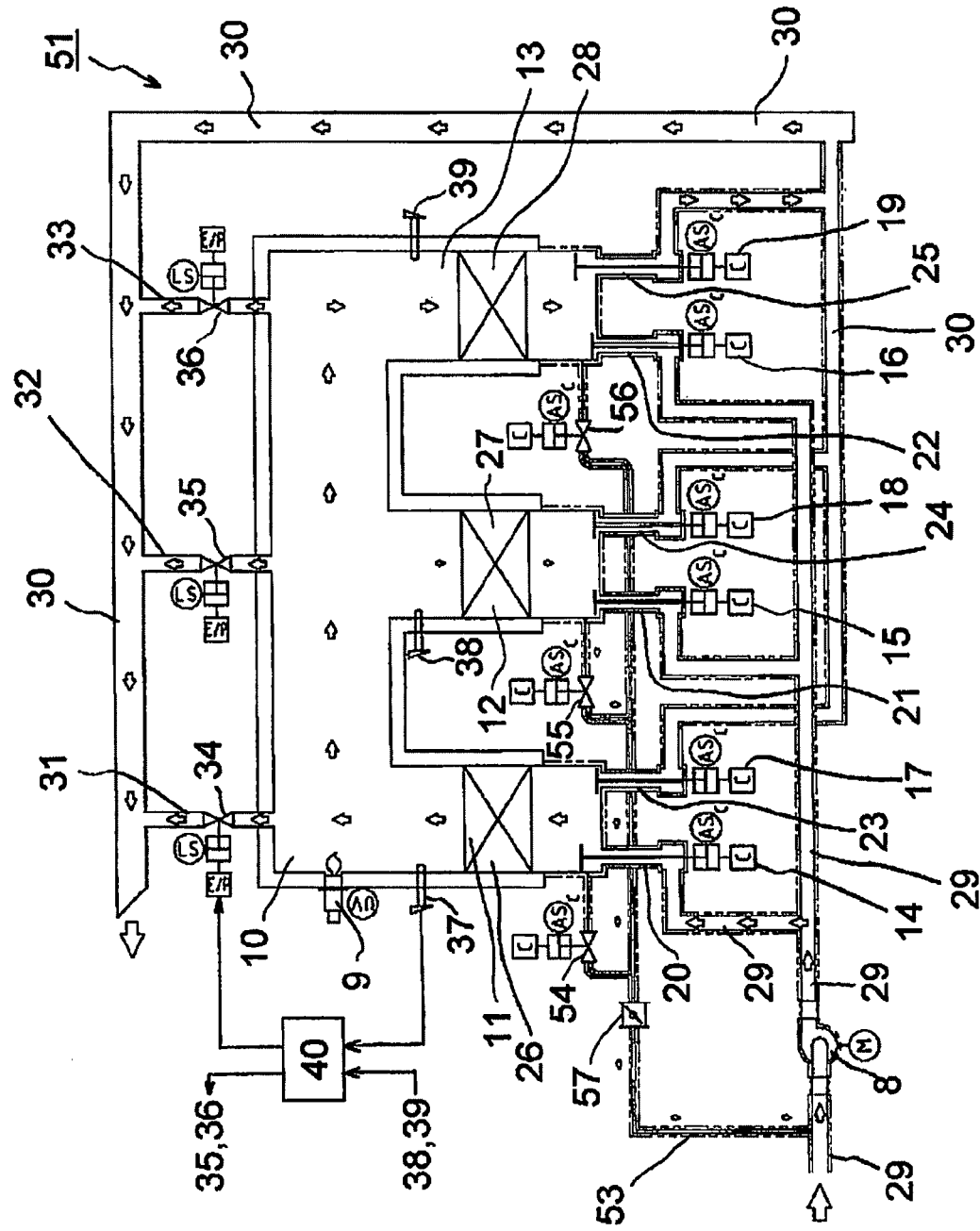
FIG. 4 is a schematic diagram illustrating a three-tower, heat storage type waste gas purification apparatus as another modification of the heat storage type waste gas purification apparatus in FIG. 1.

With reference to FIGS. 4 and 5, a heat storage type waste gas purification apparatus 51 as a modification of the above heat storage type waste gas purification apparatus 1 will be described below. The heat storage type waste gas purification apparatus 1 is a so-called "two-tower type", whereas the heat storage type waste gas purification apparatus 51 is a so-called "three-tower type" having three sets of a heat storage chamber and a heat storage body. Except for this difference, the heat storage type waste gas purification apparatus 51 has approximately the same configuration as that of the heat storage type waste gas purification apparatus 1. In FIGS. 4 and 5, the same element or component as that in FIG. 1 is assigned with the same reference sign, and detailed description thereof will be omitted.

As illustrated in FIG. 4, the heat storage type waste gas purification apparatus 51 comprises a combustion chamber 10 provided with a burner 9, and a plurality of heat storage chambers 11, 12, 13 each having one, first, end (upper end) coupled to the combustion chamber 10 in communicating relation with each other.

In a similar manner to that in the heat storage type waste gas purification apparatus 1, the heat storage type waste gas purification apparatus 51 comprises: first to third supply ports 20, 21, 22 each equipped with a respective one of three supply on-off valves 14, 15, 16; and first to third discharge ports 23, 24, 25 each equipped with a respective one of three discharge on-off valves 17, 18, 19. Each of the on-off valves 16, 19 has the same configuration as that of the remaining on-off valves 14, 15, 17, 18.

The heat storage type waste gas purification apparatus 51 further comprises first to third heat storage bodies 26, 27, 28 each provided in a respective one of the plurality of heat storage chambers 11, 12, 13. The third heat storage body 28 has the same structure as that of the first and second heat storage bodies 26, 27.

The heat storage type waste gas purification apparatus 51 further comprises a supply duct 29, a discharge duct 30 and a blower 8. The heat storage type waste gas purification apparatus 51 further comprises a purging line 53 as a circulation line connecting respective second-end regions of the first to third heat storage chambers 11, 12, 13 to the supply duct 29 to allow gas in a selected one of the second-end regions of the first to third heat storage chambers 11, 12 to be merged with gas before flowing into the blower 8. That is, the purging line 53 as the circulation line is connected to the supply line 29 at a position upstream of the blower 8. Thus, the purging line 53 functions as a return line for allowing gas in a selected one of the second-end regions of the first to third heat storage chambers 11, 12, 13 to be suckingly returned to the supply duct 29 at a position upstream of the blower 8 once.

The purging line 53 is provided with first to third purge on-off valves 54, 55, 56, and a purge adjusting valve 57. The first purge on-off valve 54 is configured to selectively open up and close off a flow from the second-end region of the first heat storage chamber 11 to the supply duct 29. The second purge on-off valve 55 is configured to selectively open up and close off a flow from the second-end region of the second heat storage chamber 12 to the supply duct 29. The third purge on-off valve 56 is configured to selectively open up and close off a flow from the second-end region of the third heat storage chamber 13 to the supply duct 29. The purge adjusting valve 57 is provided in the purging line 53 and configured to adjust a flow rate of gas to be permitted to flow from a selected one of the second-end regions of the first to third heat storage chambers 11, 12, 13 toward the supply duct 29 and to be merged with gas in the supply duct 29.

The heat storage type waste gas purification apparatus 51 further comprises a plurality of bypass passages 31, 32, 33 each connected to the combustion chamber 10. Each of the first to third bypass passages 31, 32, 33 communicates or connects between the combustion chamber 10 and the discharge duct 30. Each of the first to third bypass passages 31, 32, 33 is connected to the combustion chamber 10 at a position directly above a respective one of the first to third heat storage chambers 11, 12, 13, and equipped with a respective one of three bypass on-off valves 34, 35, 36. Further, each of the first to third bypass passages 31, 32, 33 is connected to a top portion (top wall) of the combustion chamber 10. Although the first to third bypass passages 31, 32, 33 in this modified embodiment are connected to the top wall, the present invention is not limited thereto.

The heat storage type waste gas purification apparatus 51 further comprises first to third temperature detectors 37, 38, 39 each provided in the vicinity of the upper end of a respective one of the first to third heat storage chambers 11, 12, 13, and a control section 40. The third temperature detector 39 is configured to detect a temperature of a region just above the third heat storage chamber 13. The control section 40 is operable, based on temperature information from the first to third temperature detectors 37, 38, 39, to control the on-off valves 34, 35, 36 to release surplus heat. The on-off valves 34, 35, 36 and the first to third bypass passages 31, 32, 33 make it possible to release surplus heat to thereby avoid damage to the combustion chamber 10 due to a rapid increase in internal temperature thereof. The control section 40 is also operable to control an open/closed state of each of the on-off valves 14 to 19.

As with the heat storage type waste gas purification apparatus 1, the heat storage type waste gas purification apparatus 51 configured as above has the first to third bypass passages provided correspondingly to the three towers (first to third heat storage chambers), so that it becomes possible to prevent the lopsided deposition of silica powder, while releasing surplus heat. In addition, it becomes possible to realize the same advantageous effects as those of the heat storage type waste gas purification apparatus 1, such as the advantage of being able to prevent the occurrence of various problems due to the lopsided silica deposition.

A waste gas purifying process using the above three-tower, heat storage type waste gas purification apparatus 51 will be described below. The arrows in FIG. 5 indicate flows of untreated gas and treated gas. The following description will be made on an assumption that the first heat storage chamber 11 and the third heat storage chamber 13 are initially set, respectively, as the supply side and the discharge side, as illustrated in FIG. 5(*a*), wherein the second heat storage chamber 12 is subjected to purging. In this case, waste gas to be treated (untreated gas) reaches the first heat storage chamber 11 via the first supply port 20.

Then, when the waste gas passes through the first heat storage body 26 of the first heat storage chamber 11, it is heated by heat exchange with the first heat storage body 26. On the other hand, the first heat storage body 26 is cooled while releasing heat. Then, when the waste gas heated by the first heat storage body 26 reaches the combustion chamber 10, components contained therein are combusted and decomposed.

Subsequently, treated gas after the combustion passes through the third heat storage body 28 of the third heat storage chamber 13. In this process, the treated gas is cooled by heat exchange with the third heat storage body 28. On the other hand, the third heat storage body 28 stores heat therein. The cooled treated gas passes through the third discharge port 25 and reaches the discharge duct 30.

In FIG. 5, in order to explain a function of the first to third bypass passages 31, 32, 33, the arrows are illustrated to indicate that treated gas is flowing via each of the on-off valves 34, 35, 36 being in an open state. However, fundamentally, each of the on-off valves 34, 35, 36 is in a closed state. Then, as the need arises, surplus heat will be released from the first to third bypass passages 31, 32, 33.

During the above process, the second purge on-off valve 55 is in an open state, and each of the first and third purge on-off valves 54, 56 is in a closed state. This allows a small amount of treated gas (cleaned air) purified by the combustion chamber to be supplied to the second heat storage chamber 12, and allows untreated gas stagnating inside the second heat storage chamber 12 to be returned from the second-end region of the second heat storage chamber 12 to the supply duct 29 via the purging line 53. The adjusting valve 57 is set such that each of a flow rate of cleaned air to be introduced into the second heat storage chamber 12 and a flow rate of untreated gas to be returned from the second heat storage chamber 12 to the supply duct 29 to become an adequate value (small value). In the three-tower apparatus 51, the resting heat storage chamber other than the supply-side and discharge-side heat storage chambers can be purged, so that it becomes possible to prevent untreated gas from being discharged to the discharge duct 30 to thereby ensure stable purification performance.

When the above apparatus operation is continued, the first heat storage body 26 of the first heat storage chamber 11 is cooled while releasing heat, and the third heat storage body 28 of the third heat storage chamber 13 is heated while storing heat therein. Thus, after elapse of a certain time, the on-off valve 18 of the second discharge port 24 of the second heat storage chamber 12 is opened (first valve control). Further, the on-off valve 19 of the third discharge port 25 of the third heat storage chamber 13 is closed (second valve control). Further, the on-off valve 16 of the third supply port 22 of the third heat storage chamber 13 is opened (third valve control). Further, the on-off valve 14 of the first supply port 20 of the first heat storage chamber 11 is closed (fourth valve control). As a result of the first to fourth valve controls, the operational state illustrated in FIG. 5(*a*) is switched to the operational state illustrated in FIG. 5(*b*). In FIG. 5(*b*), the third heat storage chamber 13 is set as the supply side, and the second heat storage chamber 12 is set as the discharge side, wherein the first heat storage chamber 11 is subjected to purging. The first to fourth valve controls may be performed in sequence, for example, at intervals of about two seconds. This makes it possible to prevent untreated gas from mixing in treated gas discharged to the discharge duct 30 (the same applies to aftermentioned valve controls).

When the supply and discharge on-off valves are switched to the open/closed states illustrated in FIG. 5(*b*), the purge on-off valves are simultaneously switched. In FIG. 5(*b*), the first purge on-off valve 54 is in an open state, and each of the second and third purge on-off valves 55, 56 is in a closed state. This allows a small amount of treated gas (cleaned air) purified by the combustion chamber to be supplied to the first heat storage chamber 11, and allows untreated gas stagnating inside the first heat storage chamber 11 to be returned from the second-end region of the first heat storage chamber 11 to the supply duct 29 via the purging line 53.

Thus, as illustrated in FIG. 5(b), waste gas to be subsequently treated can be heated by heat exchange with the third heat storage body 28 sufficiently storing heat therein. The heated waste gas is treated in the combustion chamber 10, and, after being cooled by heat exchange with the second heat storage body 27, discharged. Then, after elapse of a certain time, the on-off valve 17 of the first discharge port 23 of the first heat storage chamber 11 is opened (first valve control). Further, the on-off valve 18 of the second discharge port 24 of the second heat storage chamber 12 is closed (second valve control). Further, the on-off valve 15 of the second supply port 21 of the second heat storage chamber 12 is opened (third valve control). Further, the on-off valve 16 of the third supply port 22 of the third heat storage chamber 13 is closed (fourth valve control). As a result of the first to fourth valve controls, the operational state illustrated in FIG. 5(b) is switched to the operational state illustrated in FIG. 5(c). In FIG. 5(c), the second heat storage chamber 12 is set as the supply side, and the first heat storage chamber 12 is set as the discharge side, wherein the first heat storage chamber 11 is subjected to purging.

When the supply and discharge on-off valves are switched to the open/closed states illustrated in FIG. 5(c), the purge on-off valves are simultaneously switched. In FIG. 5(c), the third purge on-off valve 56 is in an open state, and each of the first and second purge on-off valves 54, 55 is in a closed state. This allows a small amount of treated gas (cleaned air) purified by the combustion chamber to be supplied to the third heat storage chamber 13, and allows untreated gas stagnating inside the third heat storage chamber 13 to be returned from the second-end region of the third heat storage chamber 13 to the supply duct 29 via the purging line 53.

Thus, as illustrated in FIG. 5(c), waste gas to be subsequently treated can be heated by heat exchange with the second heat storage body 27 sufficiently storing heat therein. The heated waste gas is treated in the combustion chamber 10, and, after being cooled by heat exchange with the first heat storage body 26, discharged. Then, after elapse of a certain time, the on-off valve 19 of the third discharge port 25 of the third heat storage chamber 13 is opened (first valve control). Further, the on-off valve 17 of the first discharge port 23 of the first heat storage chamber 11 is closed (second valve control). Further, the on-off valve 14 of the first supply port 20 of the first heat storage chamber 11 is opened (fourth valve control). Further, the on-off valve 15 of the second supply port 21 of the second heat storage chamber 12 is closed (third valve control). As a result of the first to fourth valve controls, the operational state illustrated in FIG. 5(c) is switched to the operational state illustrated in FIG. 5(a). In FIG. 5(a), the first heat storage chamber 11 is set as the supply side, and the third heat storage chamber 13 is set as the discharge side, wherein the second heat storage chamber 12 is subjected to purging. When the supply and discharge on-off valves are switched to the open/closed states illustrated in FIG. 5(a), the purge on-off valves are simultaneously switched as mentioned above.

By continuously operating the apparatus while repeating the above control action at intervals of a certain time, it becomes possible to realize an efficient combustion treatment utilizing waste heat.

In the waste gas purifying process using the above heat storage type waste gas purification apparatus 51, when a temperature measured by one of the first to third temperature detectors 37, 38, 39 is excessively high (is greater than a given value), one or more of the bypass on-off valves 34, 35, 36 are switched to select a desired one or two of the first to third bypass passages 31, 32, 33 so as to release surplus heat from the selected one or two bypass passages, or to release surplus heat from all of the bypass passages, for some situations. Thus, it becomes possible to prevent the lopsided silica deposition, and prevent the occurrence of various problems due to the lopsided silica deposition described based on FIG. 2. Further, the prevention of the lopsided silica deposition eventually realizes high decomposition efficiency of VOC.

Figure 6:
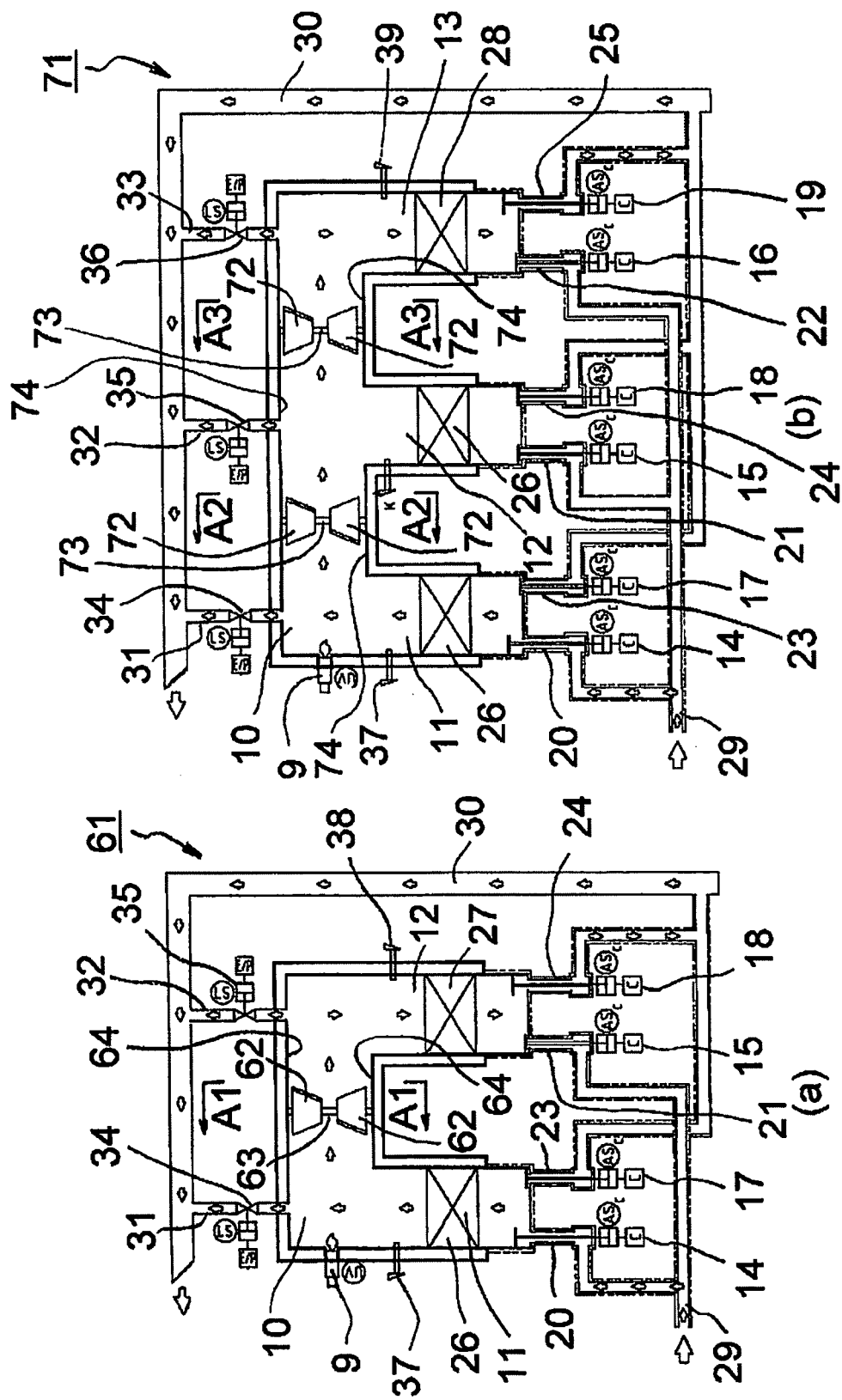
Figure 7:
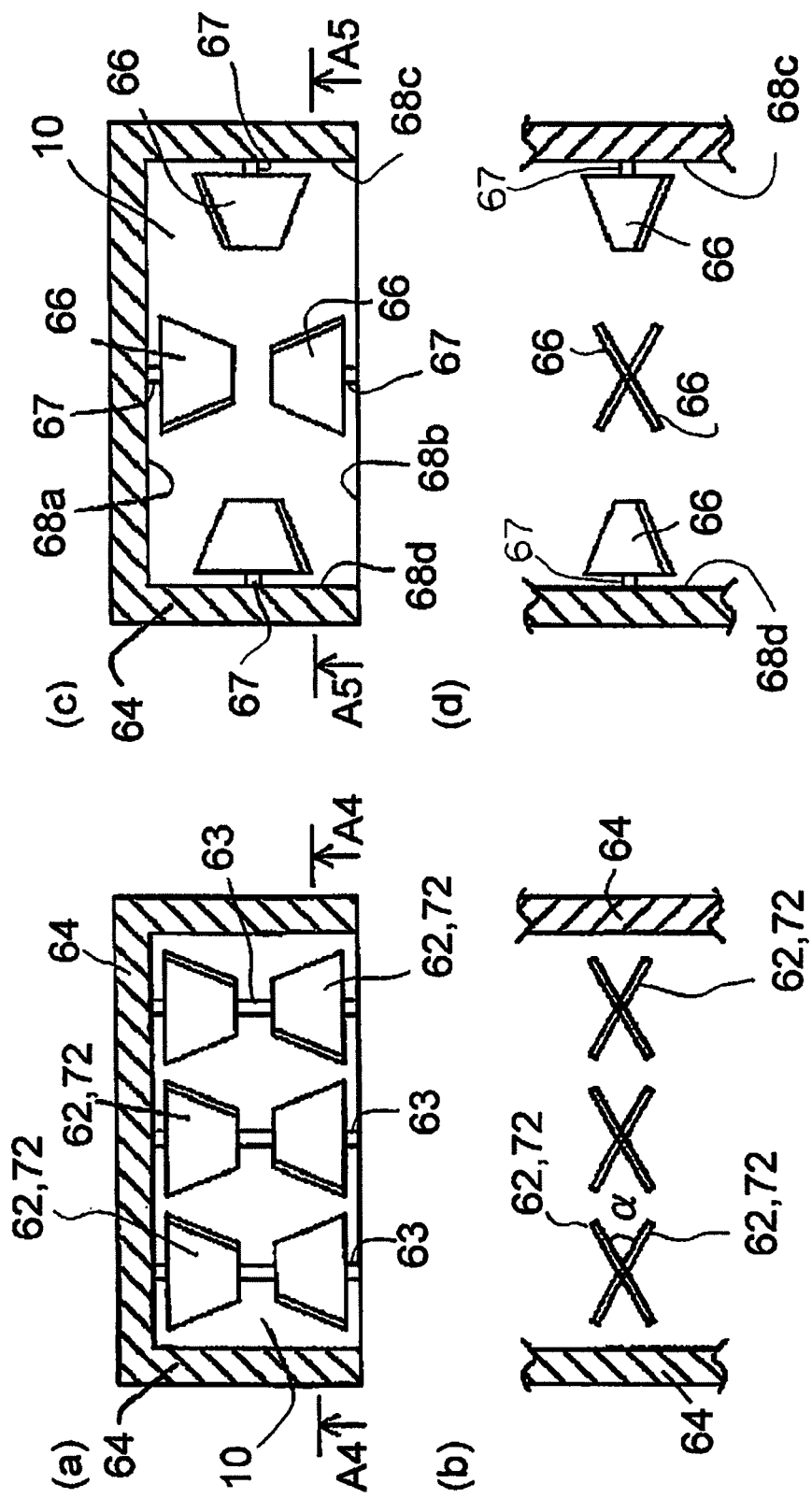

With reference to FIGS. 6 and 7, heat storage type waste gas purification apparatuses 61, 71 as modifications of the above heat storage type waste gas purification apparatuses 1, 51 will be described below. That is, each of the above heat storage type waste gas purification apparatuses 1, 51 may be provided with an agitation plate in the combustion chamber. The heat storage type waste gas purification apparatus 61 illustrated in FIG. 6(a) has the same configuration as that of the heat storage type waste gas purification apparatus 1, except that the apparatus 61 is provided with an agitation plate 62 as an agitation device. The heat storage type waste gas purification apparatus 71 illustrated in FIG. 6(b) has the same configuration as that of the heat storage type waste gas purification apparatus 51, except that the apparatus 71 is provided with an agitation plate 72 as an agitation device. In FIG. 6, the same element or component as that in FIGS. 1 and 4 is assigned with the same reference sign, and detailed description thereof will be omitted.

In an internal space of a combustion chamber 10 constituting the apparatus 61 illustrated in FIG. 6(a), an agitation plate 62 consisting of three sets of two upper and lower agitation plate elements is provided at a position between a region of the internal space just above a first heat storage chamber 11 and a region of the internal space just above a second heat storage chamber 12 adjacent to the first heat storage chamber 11. As illustrated in FIG. 6(a) and FIGS. 7(a) and 7(b), in the agitation plate 62, each of the three set of two upper and lower agitation plate elements are supported by a support member 63 fixed to an upper portion and a lower portion of a casing 64 defining the internal space. In this modified embodiment, the combustion chamber 10, and the first and second heat storage chambers 11, 12 are formed by the common casing, and this common casing is the "casing 64 defining the internal space".

On the other hand, in an internal space of a combustion chamber 10 constituting the apparatus 71 illustrated in FIG. 6(b), an agitation plate 72 consisting of three sets of two upper and lower agitation plate elements is provided at a position between a region of the internal space just above a first heat storage chamber 11 and a region of the internal space just above a second heat storage chamber 12 adjacent to the first heat storage chamber 11. Further, in the internal space of the combustion chamber 10 constituting the apparatus 71 illustrated in FIG. 6(b), another agitation plate 72 consisting of three sets of two upper and lower agitation plate elements is provided at a position between a region of the internal space just above the second heat storage chamber 12 and a region of the internal space just above a third heat storage chamber 13 adjacent to the second heat storage chamber 12. As illustrated in FIG. 6(b) and FIGS. 7(a) and 7(b), in the agitation plate 72, each of the three sets of two upper and lower agitation plate elements 72 are supported by a support member 73 fixed to an upper portion and a lower portion of a casing 74 defining the internal space. In this modified embodiment, the combustion chamber 10, and the first to third heat storage chambers 11, 12, 13 are formed by the common casing, and this common casing is the "casing 74 defining the internal space". An angle α between the upper and lower agitation plate elements illustrated in FIG.

7(b) may be set in the range of about 10 to 90 degrees to bring out desirable agitation performance.

Each of the agitation plates 62, 72 illustrated in FIG. 6 and FIG. 7 makes it possible to extend a retention time of untreated gas in the combustion chamber 10. The extended retention time of untreated gas in the combustion chamber 10 makes it possible to enhance decomposition efficiency of waste gas components. The agitation plate constituting the heat storage type waste gas purification apparatus 61 (71) is not limited to the agitation plate 62 (72) illustrated in FIGS. 7(a) and 7(b). For example, an agitation plate 66 illustrated in FIGS. 7(c) and 7(d) may be used.

The agitation plates 66 illustrated in FIGS. 7(c) and 7(d) is composed of four agitation plate elements arranged and fixed at positions between a region of the internal space just above the first (second) heat storage chamber and a region of the internal space just above the second (third) heat storage chamber adjacent to the first (second) heat storage chamber. Each of the four agitation plate elements is supported in a cantilevered manner by a respective one of a top wall 68a a bottom wall 68b and two opposed side walls 68c, 68d defining the internal space. The agitation plate 66 illustrated in FIGS. 7(c) and 7(d) also makes it possible to extend a retention time of untreated gas in the combustion chamber 10.

As compared to the agitation plate 66 illustrated in FIGS. 7(c) and 7(d), the agitation plate 62 (72) illustrated in FIGS. 7(a) and 7(b) is advantageous in terms of extending a retention time and in terms of safety for mounting of the agitation plate. Specifically, even in a situation where the combustion chamber has an elongated cross-section as illustrated in FIGS. 7(a) and 7(c), the agitation plate elements can be adequately arranged in such a manner as to reduce a gap therebetween to enhance an agitation effect. For example, when a height dimension of the combustion chamber is increased, the number of agitation plate elements in a height direction may be increased. On the other hand, when a lateral dimension of the combustion chamber is increased, the number of agitation plate elements in a lateral direction may be increased. Further, in the agitation plate 62 (72), the agitation plate elements can be strongly supported, as compared to a cantilevered support structure.

Each of the heat storage type waste gas purification apparatuses 61, 71 illustrated in FIGS. 6 and 7 has the same advantageous effects as those described in connection with the heat storage type waste gas purification apparatuses 1, 51. That is, each of the apparatuses 61, 71 can prevent the lopsided deposition of silica powder while releasing surplus heat, and solve the various problems due to the lopsided deposition of silica powder.

Figure 8:
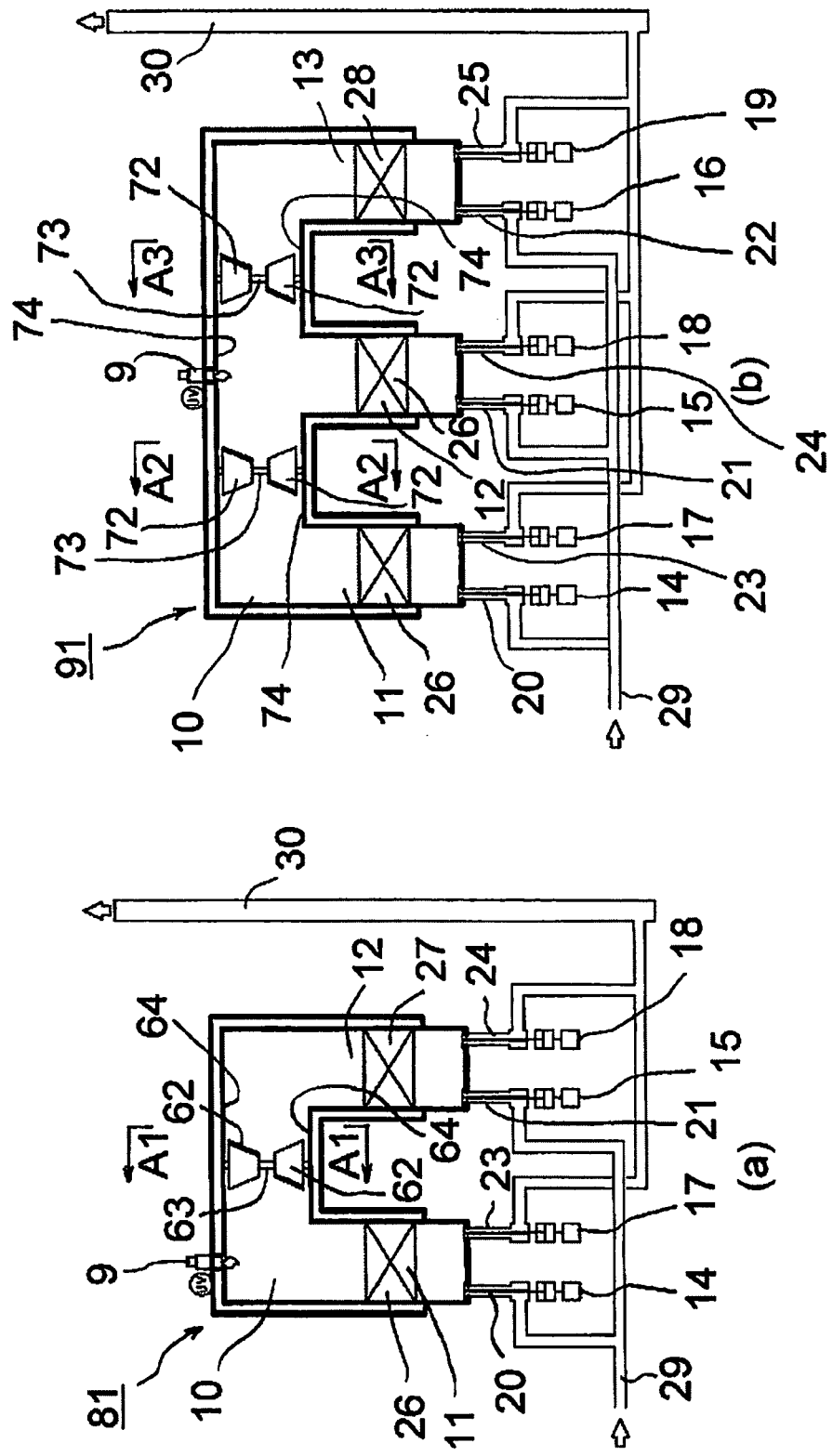

The effects of the agitation plate 62 (72) in FIGS. 6 and 7 are valid even in a heat storage type waste gas purification apparatus devoid of the bypass passages (31, 32, etc.). With reference to FIG. 8, examples of the heat storage type waste gas purification apparatus devoid of the bypass passages, as respective modifications of the heat storage type waste gas purification apparatuses 61, 71, will be described. That is, a heat storage type waste gas purification apparatus 81 illustrated in FIG. 8(a) has the same configuration as that of the apparatus 61 illustrated in FIG. 6(a), except that the apparatus 81 is devoid of the first and second bypass passages 31, 32 and the bypass on-off valves 34, 35. A heat storage type waste gas purification apparatus 91 illustrated in FIG. 8(b) has the same configuration as that of the apparatus 71 illustrated in FIG. 6(b), except that the apparatus 91 is devoid of the first to third bypass passages 31, 32, 33 and the bypass on-off valves 34, 35, 36. In FIGS. 8(a) and 8(b), the same element or component as that in FIGS. 6(a) and 6(b) is assigned with the same reference sign, and detailed description thereof will be omitted.

Based on the agitation plate 62 (72), each of the heat storage type waste gas purification apparatuses 81, 91 illustrated in FIG. 8 can ensure a retention time of untreated gas in the combustion chamber 10. In addition, the agitation plate 62 (72) is advantageous in terms of extending a retention time and in terms of safety for mounting of the agitation plate. Each of the heat storage type waste gas purification apparatuses 81, 91 can realize to enhance the safety for mounting of the agitation plate, and enhance decomposition efficiency of waste gas components.

With reference to FIGS. 9(a), 10(a) and 11(a), three heat storage type waste gas purification apparatuses 101, 111 121 as modifications (designed to suppress static pressure fluctuation) of the above heat storage type waste gas purification apparatus will be described. Each of the heat storage type waste gas purification apparatuses 101, 111 121 has the same configuration as that of the heat storage type waste gas purification apparatus 1, except that each of the apparatuses 101, 111 121 has a configuration for suppressing static pressure fluctuation, as described below. In FIGS. 9(a), 10(a) and 11(a), the same element or component as that in FIG. 1 is assigned with the same reference sign, and detailed description thereof will be omitted.

As illustrated in FIG. 9(a), the heat storage type waste gas purification apparatus 101 comprises a combustion chamber 10, first and second heat storage chambers 11, 12, supply and discharge on-off valves 14, 15, 17, 18, first and second supply ports 20, 21, first and second discharge ports 23, 24, first and second heat storage bodies 26, 27, a supply duct 29, a discharge duct 30, a blower 8, first and second bypass passages 31, 32, and bypass on-off valves 34, 35 (Each of the apparatuses 111, 121 described based on FIGS. 10(a) and 11(a) has the same components). Although illustration is omitted, the combustion chamber 10 is provided with a burner 9 in the same manner as described above, and each of the apparatuses 101, 111 121 is provided with first and second temperature detectors 37, 38. The blower 8 is provided in the supply duct 29 and configured to direct untreated gas to the first and second supply ports 20, 21, as mentioned in the above embodiment.

The heat storage type waste gas purification apparatus 101 further comprises a return line 102 connecting between the discharge duct 30 and the supply duct 29. The return line 102 allows treated gas in the discharge duct 30 to be merged with gas before flowing into the blower 8. The apparatus 101 further comprises a three-way valve 103 provided in the discharge duct 30 at a branch point 30a to the return line 102 (a connection point with the return line).

The three-way valve 103 is an adjusting valve configured to adjust a degree of opening of a vane so as to adjust a flow rate of gas to be permitted to flow through a region of the discharge duct 30 on a discharge side with respect to (downstream of) a connection point 30a of the discharge duct 30 with the return line 102 to thereby adjust a flow rate of gas to be permitted to flow into the return line 102.

The heat storage type waste gas purification apparatus 101 further comprises a flow rate detection section 104 and a pressure detection section 105. The flow rate detection section 104 is configured to detect a flow rate of gas blown from the blower toward the supply ports 20, 21. The pressure detection section 105 is configured to detect a pressure in the supply duct 29 at a position after a merging point with gas from the return line 102 and before flowing into the blower 8. The heat storage type waste gas purification apparatus 101 has a control section 40 which is operable, based on results of the detections by the flow rate detection section 104 and the pressure detection section 105, to control a degree of opening of the adjusting valve (three-way valve 103). The control section 40 also has the same function as that described in connection with the heat storage type waste gas purification apparatus 1.

The flow rate detection section 104 is composed, for example, of an orifice flowmeter which may be provided with a differential pressure transmitter 104a or the like. The pressure detection section 105 is composed, for example, of a differential pressure transmitter. In this case, an inverter 8b provided in an electric motor 8a of the blower 8, and each of the differential pressure transmitter 104a and a pressure transmitter (105), are electrically connected to each other through the control section (controller) 40. Further, for example, the three-way valve 103 is provided with a valve positioner 103a which is electrically connected to the control section 40. Based on a pressure measured by the differential pressure transmitter (pressure transmitter 105) and a differential pressure from the differential pressure transmitter 104a, the degree of opening of the three-way valve 103 is adjusted through the control section 40.

The heat storage type waste gas purification apparatus 101 configured as above can suppress static pressure fluctuation which would otherwise occur during opening and closing of the on-off valves 14, 15, 17, 18 provided in the first and second supply ports 20, 21 and the first and second discharge ports 23, 24. This point will be described in detail. As mentioned above, during switching between the two different combinations of the supply side and the discharge side in the first and second heat storage chambers, the on-off valves 14, 15, 17, 18 are switched. In the course of the switching, the supply on-off valve and the discharge on-off valve are simultaneously in the open state, although it is for just a moment. Therefore, a pressure loss inside the apparatus 101 is lowered, and static pressure fluctuation inside the apparatus 101 is likely to undesirably occur. The apparatus 101 having the return line 102 and the three-way valve 103 can suppress such static pressure fluctuation. In this regard, it is conceivable to suppress the static pressure fluctuation by means of adjustment of a gas volume from the blower 8. Differently from this idea, the apparatus 101 is designed to realize to suppress the static pressure fluctuation by means of adjustment of the adjusting valve (three-way valve 103).

Specifically, the three-way valve 103 is configured such that the degree of opening thereof is adjusted to increase a flow rate toward the return line 102, when a pressure detected by the pressure detection section 105 becomes smaller. The three-way valve 103 is also configured such that the degree of opening thereof is adjusted to increase the flow rate toward the return line 102, when a flow rate detected by the flow rate detection section 104 becomes larger. In this modified embodiment, the three-way valve 103 may be configured to be adjusted based on only one of the detection results by the pressure detection section 105 and the flow rate detection section 104. The three-way valve 103 may be configured to be adjusted at a preset timing or at a preset degree of opening of the on-off valves 14, 15, 17, 18 during the switching of the on-off valves 14, 15, 17, 18.

The positions of the flow rate detection section 104 and the pressure detection section 105, i.e., detecting positions for adjusting the degree of opening of the three-way valve 103, are not limited thereto. For example, the flow rate detection section 104 may be disposed to detect a flow rate in the discharge duct 30 at a position after being discharged from one of the discharge ports 23, 24 and before the branch point 30a to the return line 102. Further, the pressure detection section 105 may be disposed to detect a pressure in the supply duct 20 at a position before (upstream of) the merging point with gas from the return line 102.

The return line 102 has not only the above function of suppressing the static pressure fluctuation but also a function of reducing a fuel cost during a warm-up operation. Specifically, in some situations, the heat storage type waste gas purification apparatus is subjected to a warm-up operation or a stand-by operation. In such situations, ambient air is introduced to warm up the combustion chamber and heat storage chamber. During this operation, resulting gas can be circulated via the return line 102 so as to reduce a fuel cost.

As above, the heat storage type waste gas purification apparatus 101 can suppress the static pressure fluctuation during the switching of the supply and discharge on-off valves. This makes it possible to prevent a volume of untreated gas flowing from a target facility into the apparatus 101, and a volume of treated gas discharged via the discharge duct 30, from increasing due to the static pressure fluctuation. Although the aftermentioned heat storage type waste gas purification apparatuses 111, 121 have the same advantageous effects as those of the heat storage type waste gas purification apparatuses 101, the heat storage type waste gas purification apparatuses 101 can realize the advantageous effects with the simplest configuration.

Next, with reference to FIG. 10(a), the heat storage type waste gas purification apparatus 111 will be described. As illustrated in FIG. 10(a), the heat storage type waste gas purification apparatus 111 comprises a return line 102 connecting between a discharge duct 30 and a supply duct 29.

The heat storage type waste gas purification apparatus 111 further comprises an adjusting valve 113 provided in the discharge duct 30 at a position on a discharge side (at a downstream position, i.e., at a position on an exit side of the discharge duct 30) with respect to a connection point 30a with the return line 102.

The adjusting valve 113 is configured to adjust a flow rate of gas to be permitted to flow through a region of the discharge passage on the discharge side with respect to the connection point 30a with the return line 102 of the discharge duct 30 to thereby adjust a flow rate of gas to be permitted to flow into the return line 102. The heat storage type waste gas purification apparatus 111 further comprises an adjusting valve 114 provided in the return line 102. The adjusting valve 114 is configured to adjust a flow rate of gas to be permitted to pass through the return line 102. Based on the adjusting valves 113, 114, the heat storage type waste gas purification apparatus 111 can effectively suppress the static pressure fluctuation.

The heat storage type waste gas purification apparatus 111 further comprises a flow rate detection section 104 and a pressure detection section 105, as with the heat storage type waste gas purification apparatus 101. The heat storage type waste gas purification apparatus 111 further comprises a control section 40 having approximately the same function as that of the control section 40 in the heat storage type waste gas purification apparatus 101. For example, the adjusting valves 113, 114 are provided, respectively, with valve positioners 103a, 114a. Each of the valve positioners 103a, 114a is electrically connected to the control section 40 to adjust a degree of opening of a respective one of the adjusting valves 113, 114.

The heat storage type waste gas purification apparatus 111 configured as above can suppress static pressure fluctuation which would otherwise occur during opening and closing of supply and discharge on-off valves 14, 15, 17, 18 provided in first and second supply ports 20, 21 and first and second discharge ports 23, 24, as with the heat storage type waste gas purification apparatus 101. Specifically, each of the adjusting valves 113, 114 is configured such that the degree of opening thereof is adjusted to increase a flow rate toward the return line 102, when a pressure detected by the pressure detection section 105 becomes smaller. Each of the adjusting valves 113, 114 is also configured such that the degree of opening thereof is adjusted to increase the flow rate toward the return line 102, when a flow rate detected by the flow rate detection section 104 becomes larger.

As above, the heat storage type waste gas purification apparatus 111 can suppress the static pressure fluctuation during the switching of the supply and discharge on-off valves. Although the aftermentioned heat storage type waste gas purification apparatus 112 has the same advantageous effects as those of the heat storage type waste gas purification apparatuses 111, the heat storage type waste gas purification apparatuses 111 can more effectively suppress the static pressure fluctuation.

Figure 11:
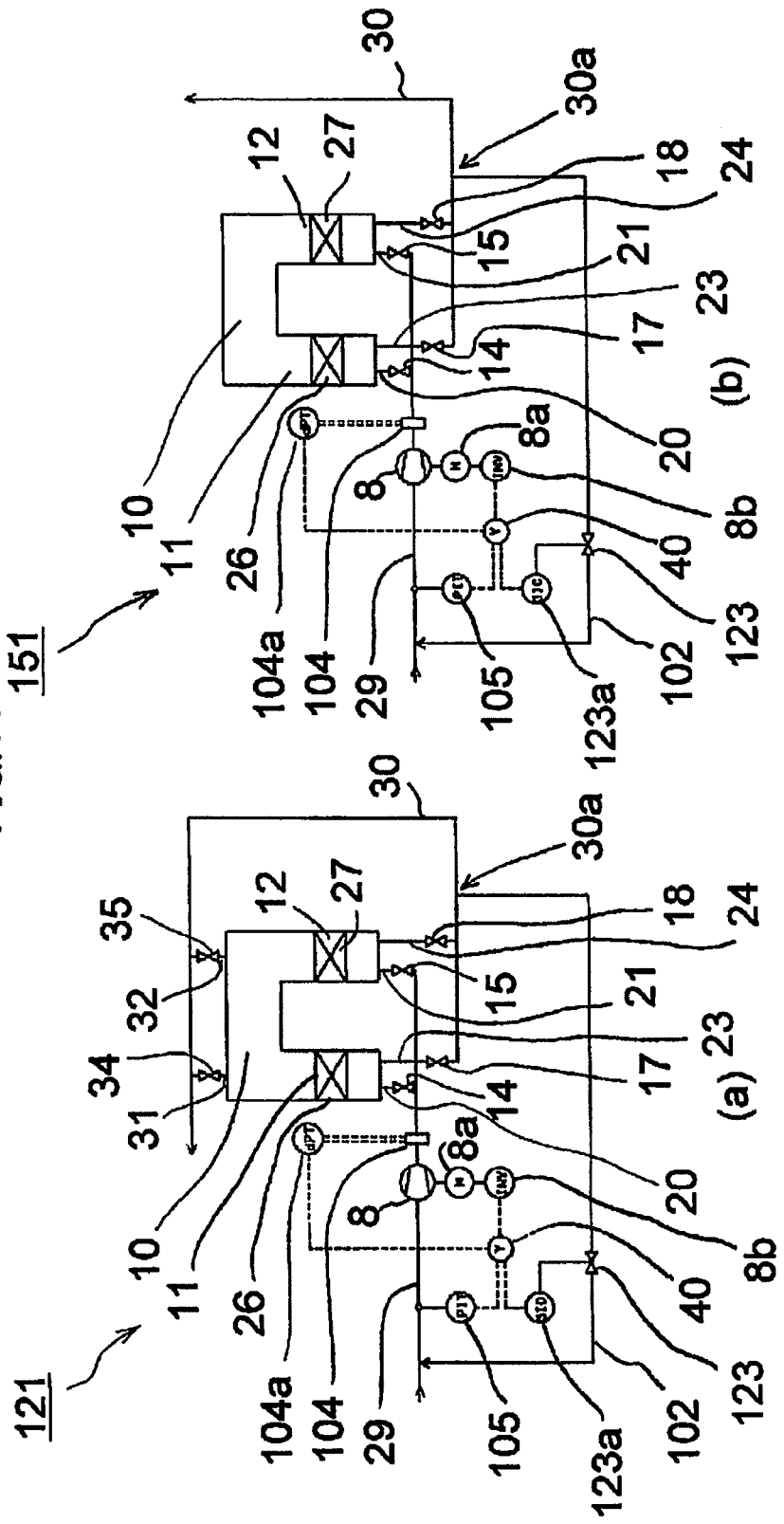
FIG. 11(a) is a schematic diagram illustrating a heat storage type waste gas purification apparatus as another further modification of the heat storage type waste gas purification apparatus in FIG. 1.
FIG. 11(b) is a schematic diagram illustrating a heat storage type waste gas purification apparatus as one modification of the heat storage type waste gas purification apparatus in FIG. 11(a).

Next, with reference to FIG. 11(*a*), the heat storage type waste gas purification apparatus 121 will be described. As illustrated in FIG. 11(*a*), the heat storage type waste gas purification apparatus 121 comprises a return line 102 connecting between a discharge duct 30 and a supply duct 29.

The apparatus 121 further comprises an adjusting valve 123 provided in the return line 102. The adjusting valve 123 is configured to adjust a flow rate of gas to be permitted to pass through the return line 102. Based on the adjusting valve 123, the heat storage type waste gas purification apparatus 121 can suppress the static pressure fluctuation.

The heat storage type waste gas purification apparatus 121 further comprises a flow rate detection section 104 and a pressure detection section 105, as with the heat storage type waste gas purification apparatus 101. The heat storage type waste gas purification apparatus 121 further comprises a control section 40 having approximately the same function as that of the control section 40 in the heat storage type waste gas purification apparatus 101. For example, the adjusting valve 123 is provided with a valve positioner 123*a*. The valve positioner 123*a* is electrically connected to the control section 40 to adjust a degree of opening of the adjusting valve 123.

The heat storage type waste gas purification apparatus 121 configured as above can suppress static pressure fluctuation which would otherwise occur during opening and closing of supply and discharge on-off valves 14, 15, 17, 18 provided in first and second supply ports 20, 21 and first and second discharge ports 23, 24, as with the heat storage type waste gas purification apparatus 101. Specifically, the adjusting valve 123 is configured such that the degree of opening thereof is adjusted to increase a flow rate toward the return line 102, when a pressure detected by the pressure detection section 105 becomes smaller. The adjusting valve 123 is also configured such that the degree of opening thereof is adjusted to increase the flow rate toward the return line 102, when a flow rate detected by the flow rate detection section 104 becomes larger.

As above, the heat storage type waste gas purification apparatus 121 can suppress the static pressure fluctuation during the switching of the supply and discharge on-off valves. Although the heat storage type waste gas purification apparatus 121 can bring out a certain level of effect with a simple configuration, there is a possibility that, when a pressure loss inside the apparatus is lowered, waste gas is not always sufficiently sucked into a suction side of a blower 8 but released to the outside via the discharge duct 30. In contrast, each of the heat storage type waste gas purification apparatuses 101, 111 can more effectively suppress the static pressure fluctuation. Further, the heat storage type waste gas purification apparatus 101 can realize the suppression with the simplest structure.

Each of the heat storage type waste gas purification apparatuses 101, 111, 121 also has the same advantageous effects as those descried in connection with the aforementioned apparatuses such as the apparatuses 1, 51. That is, it is possible to prevent the lopsided deposition of silica powder, while releasing surplus heat, and solve the various problems due to the lopsided deposition of silica powder.

Figure 9:
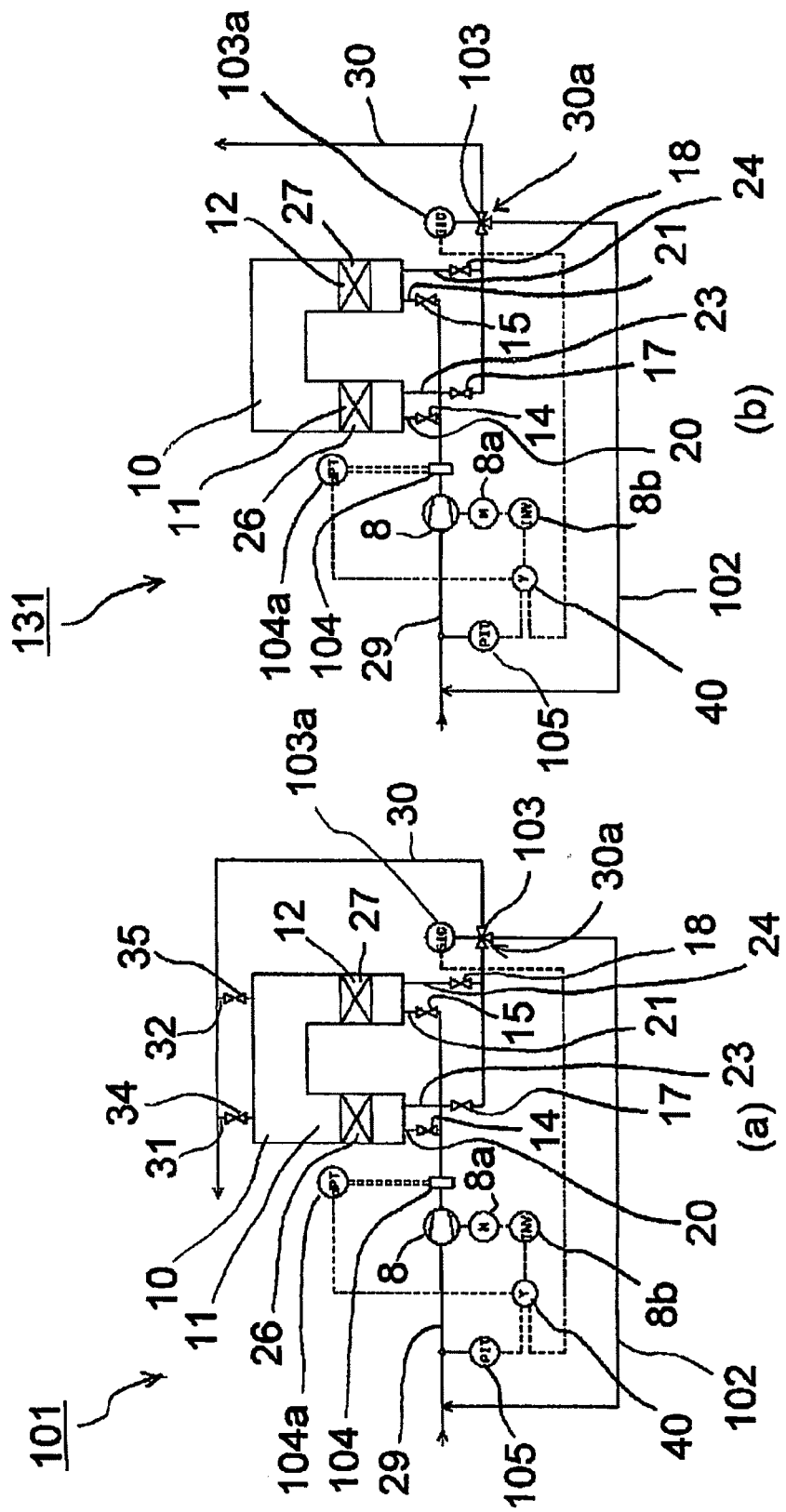
FIG. 9(a) is a schematic diagram illustrating a heat storage type waste gas purification apparatus as still another modification of the heat storage type waste gas purification apparatus in FIG. 1.
FIG. 9(b) is a schematic diagram illustrating a heat storage type waste gas purification apparatus as one modification of the heat storage type waste gas purification apparatus in FIG. 9(a).
Figure 10:
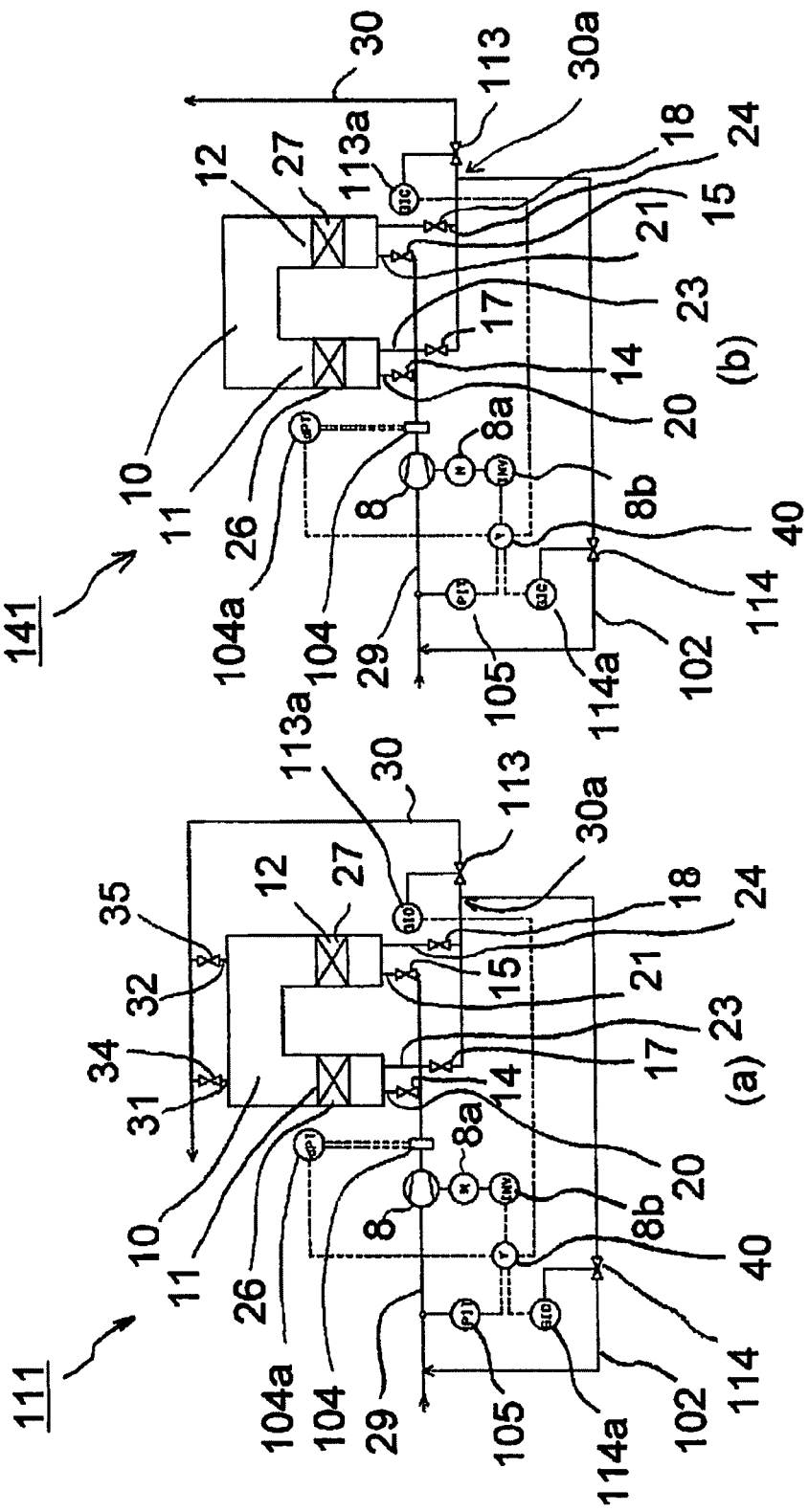
FIG. 10(a) is a schematic diagram illustrating a heat storage type waste gas purification apparatus as yet still another modification of the heat storage type waste gas purification apparatus in FIG. 1.
FIG. 10(b) is a schematic diagram illustrating a heat storage type waste gas purification apparatus as one modification of the heat storage type waste gas purification apparatus in FIG. 10(a).

The effects of the return line 102 and the adjusting valve (the three-way valve 103, the adjusting valve 113, the adjusting valve 123, etc.) in FIGS. 9 to 11 are valid even in a heat storage type waste gas purification apparatus devoid of the bypass passages (31, 32, etc.). With reference to FIGS. 9(*b*), 10(*b*), 11(*b*), examples of the heat storage type waste gas purification apparatus devoid of the bypass passages, as respective modifications of the heat storage type waste gas purification apparatuses 101, 111, 121, will be described. That is, a heat storage type waste gas purification apparatus 131 illustrated in FIG. 9(*b*) has the same configuration as that of the apparatus 101 illustrated in FIG. 9(*a*), except that the apparatus 131 is devoid of the first and second bypass passages and the bypass on-off valves. Further, a heat storage type waste gas purification apparatus 141 illustrated in FIG. 10(*b*) has the same configuration as that of the apparatus 111 illustrated in FIG. 10(*a*), except that the apparatus 141 is devoid of the first and second bypass passages and the bypass on-off valves. A heat storage type waste gas purification apparatus 151 illustrated in FIG. 11(*b*) has the same configuration as that of the apparatus 121 illustrated in FIG. 11(*a*), except that the apparatus 151 is devoid of the first and second bypass passages and the bypass on-off valves. In FIGS. 9(*b*), 10(*b*) and 11(*b*), the same element or component as that in FIGS. 9(*a*), 10(*a*) and 11(*c*) is assigned with the same reference sign, and detailed description thereof will be omitted.

Each of the heat storage type waste gas purification apparatuses 131, 141, 151 illustrated in FIGS. 9(*b*), 10(*b*) and 11(*b*) can suppress static pressure fluctuation which would otherwise occur during opening and closing of supply and discharge on-off valves 14, 15, 17, 18 provided in first and second supply ports 20, 21 and first and second discharge ports 23, 24. This makes it possible to prevent a volume of untreated gas flowing from a target facility into the apparatus 101, and a volume of treated gas discharged via a discharge passage 30, from increasing due to the static pressure fluctuation.

Figure 12:
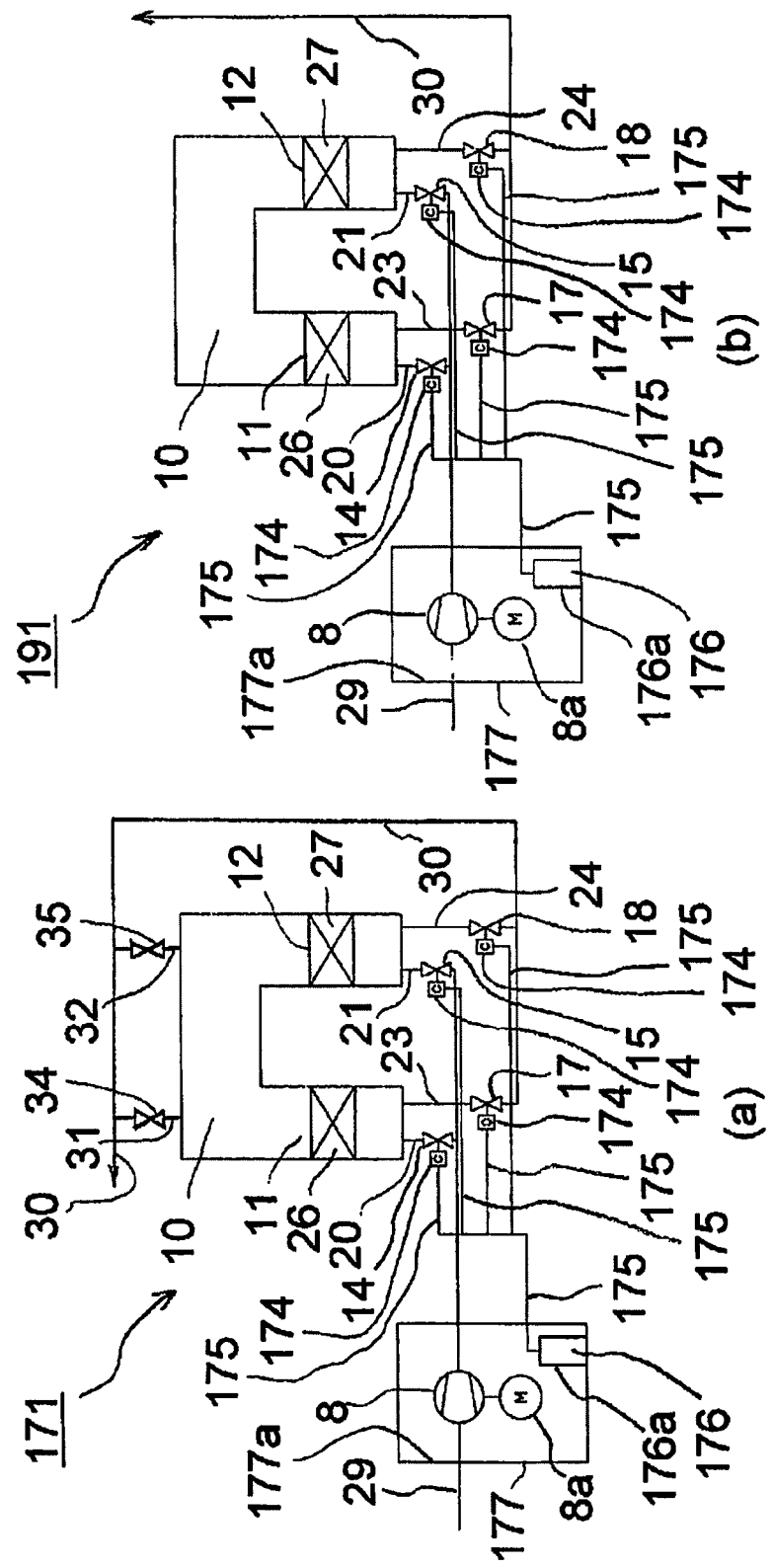
FIG. 12(a) is a schematic diagram illustrating a heat storage type waste gas purification apparatus as still a further modification of the heat storage type waste gas purification apparatus in FIG. 1.
FIG. 12(b) is a schematic diagram illustrating a heat storage type waste gas purification apparatus as one modification of the heat storage type waste gas purification apparatus in FIG. 12(a).
Figure 13:
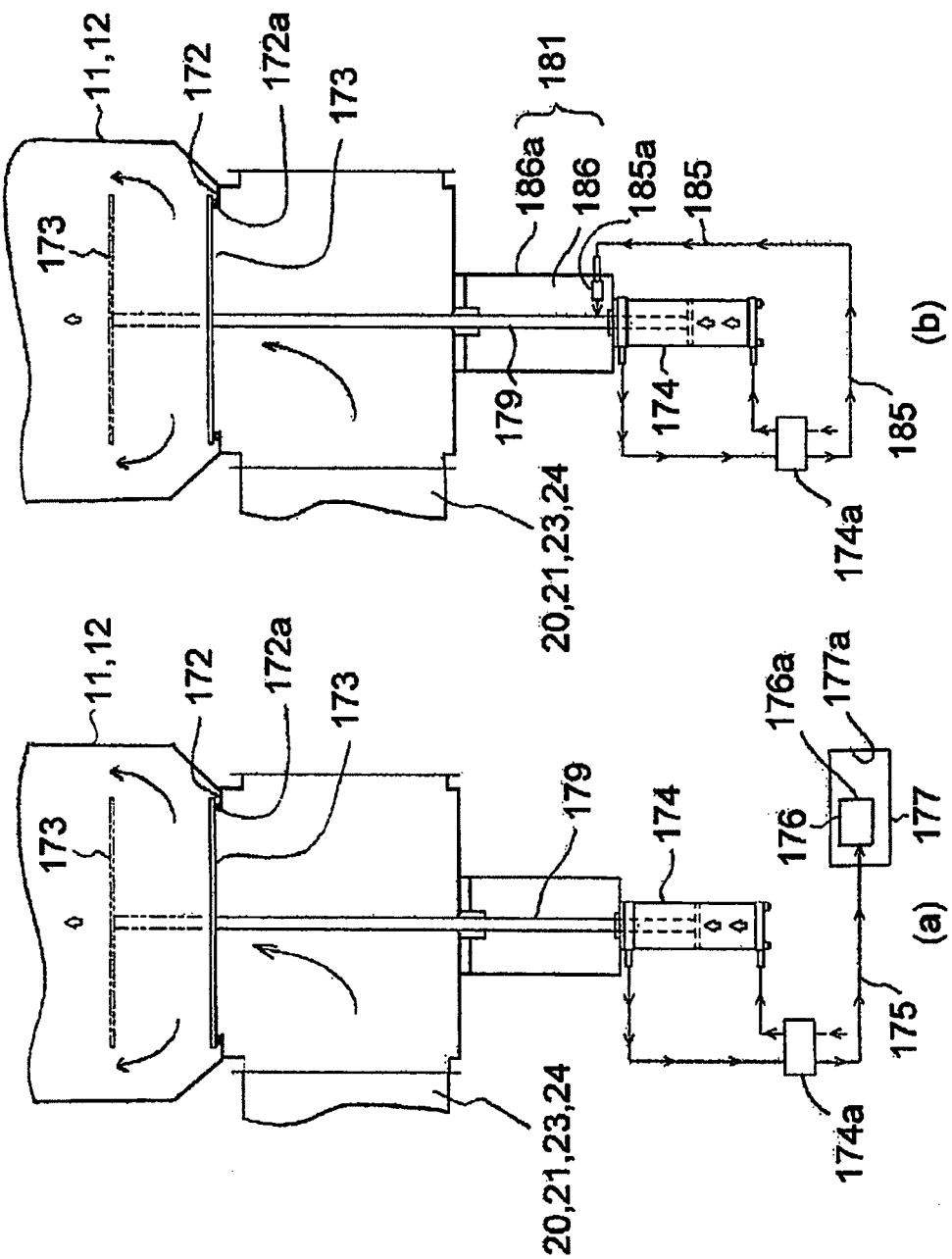
FIG. 13(a) is a schematic diagram illustrating an exhaust air noise silencing structure for on-off valves provided in each of the heat storage type waste gas purification apparatuses in FIGS. 12(a)-12(b)
FIG. 13(b) is a schematic diagram illustrating another example of the exhaust air noise silencing structure for on-off valves provided in supply inlets and discharge outlet of the heat storage type waste gas purification apparatus.

With reference to FIGS. 12 and 13, a heat storage type waste gas purification apparatus 171 as a modification (having a silencing effect) of the above heat storage type waste gas purification apparatus 1 will be described. The heat storage type waste gas purification apparatus 171 has approximately the same configuration as that of the heat storage type waste gas purification apparatus 1, except that the apparatus 171 has a configuration having a silencing effect, as described below. In FIGS. 12(*a*) and 12(*b*), the same element or component as that in FIG. 1 is assigned with the same reference sign, and detailed description thereof will be omitted.

As illustrated in FIG. 12(*a*), the heat storage type waste gas purification apparatus 171 comprises a combustion chamber 10, first and second heat storage chambers 11, 12, supply and discharge on-off valves 14, 15, 17, 18, first and second supply ports 20, 21, first and second discharge ports 23, 24, first and second heat storage bodies 26, 27, a supply duct 29, a discharge duct 30, a blower 8, first and second bypass passages 31, 32, and bypass on-off valves 34, 35. Although illustration is omitted, the combustion chamber 10 is provided with a burner 9 in the same manner as described above, and the apparatus 171 is provided with first and second temperature detectors 37, 38. The blower 8 is provided in the supply duct 29 and configured to direct untreated gas to the first and second supply ports 20, 21, as mentioned in the above embodiment.

Each of the on-off valves 14, 15 of the first and second supply ports 20, 21 and the on-off valves 17, 18 of the first and second discharge ports 23, 24 comprises a flow port-defining member 172, a valve element 173 and an air cylinder 174. Each of the on-off valves 14, 15, 17, 18 is a so-called "poppet damper (poppet valve). A structure to be described based on FIG. 13 is one example of a specific structure of each of the on-off valves 14, 15, 17, 18.

The flow port-defining member 172 additionally serves as a bottom wall of each of the first and second heat storage chambers 11, 12. The flow port-defining member 172 is provided with a flow port 172a. The valve element 173 is attached to a distal end of a rod 179 of the air cylinder 174, and configured to be movable in directions causing the valve element to come close to and away from the flow port-defining member 172, according to extending and retracting of the rod 179. More specifically, the valve element 173 is configured to be brought into contact with the flow port-defining member 172 to thereby close the flow port 172a, and then separated away from the flow port-defining member 172 to thereby open the flow port 172a. The air cylinder 174 comprises a solenoid valve 174a, wherein it is configured to drive the valve element 173 in the directions causing the contact and separation with respect to the flow port-defining member 172.

A plurality of exhaust lines 175 each configured to exhaust driving air for a respective one of the air cylinders 174 are connected to a common silencer tank 176, in a merged manner. For example, the silencer tank 176 has an outer surface provided with a sound absorbing material 176a. Alternatively, the sound absorbing material may be provided on an inner surface of the silencer tank 176. The silencer tank 176 has a tank body formed, for example, in a cylindrical or box-like shape, using a steel plate or the like. For example, as the sound absorbing material 176a, it is possible to use glass wool, rock wool or rubber.

The silencer tank 176 is disposed inside a noise insulation device for the blower 8. The noise insulation device 177 is provided in such a manner as to surround the blower 8. The noise insulation device 177 has an inner surface provided with a sound absorbing material 177a. Alternatively, the sound absorbing material may be provided on an outer surface of the noise insulation device 177. The noise insulation device is formed, for example, in a panel structure comprised of a combination of steel plate panels. For example, as the sound absorbing material 177a, it is possible to use glass wool, rock wool or rubber.

The heat storage type waste gas purification apparatus 171 can realize to reduce (silence) exhaust noise of the air cylinders of the on-off valves with high efficiency. Specifically, the silencer tank 176 connected with the exhaust lines 175 of the air cylinders 174 is provided inside the noise insulation device 177, so that it becomes possible to doubly reduce exhaust noise of the air cylinders (exhaust noise from the exhaust lines 175). In addition, the silencer tank 176 is shared by all of the exhaust lines 175, so that it becomes possible to eliminate a need to provide a silencer tank for each on-off valve (each air cylinder), thereby realizing structural simplification. Further, the noise insulation device 177 for the flower 8 is utilized, so that it is only necessary to prepare the silencer tank 176, without a need for providing an exclusive noise insulation device for the air cylinders.

The distinctive configuration (the silencer tank 176, the noise insulation device 177, etc.) described based on the heat storage type waste gas purification apparatus 171 can be applied to not only the apparatus 1 but also to the apparatuses 41, 51, 61, 71, 81, 91, 101, 111, 121, 131, 141, 151. Further, the on-off valve exhaust air noise silencing structure applicable to these the heat storage type waste gas purification apparatuses is not limited to the distinctive configuration (the silencer tank 176, the noise insulation device 177, etc.) described based on FIG. 13(a), but a structure as illustrated in FIG. 13(b) may be employed.

In a silencing device 181 illustrated in FIG. 13(b), an exhaust line 185 for exhausting driving air of each air cylinder 174 is connected to an exit port 185a opened inside a casing 186. The casing 186 is provided to hold the air cylinder 174 and surround a rod 179. For example, the casing 186 has an outer surface provided with a sound absorbing material 186a. The sound absorbing material 186a may be made of the same raw material as that for the sound absorbing material 176a. In FIG. 13(b), the same element or component as that in FIG. 13(a), etc., is assigned with the same reference sign, and detailed description thereof will be omitted.

In the silencing device 181 illustrated in FIG. 13(b), exhaust noise of the air cylinder of the on-off valve can be reduced by the sound absorbing material 186a on the outer surface of the casing 186. However, the structure illustrated in FIG. 13(a) is formed as a double structure composed of the silencer tank 176 and the noise insulation device 177, so that it becomes possible to realize to reduce noise with higher efficiency than the structure illustrated in FIG. 13(b).

The heat storage type waste gas purification apparatus 171 has the same advantageous effects as those described in connection with the aforementioned apparatuses such as the apparatuses 1, 51. That is, the apparatus 171 can prevent the lopsided deposition of silica powder while releasing surplus heat, and solve the various problems due to the lopsided deposition of silica powder.

The effects of the configuration in FIG. 12(a) comprising the silencer tank 176 and the noise insulation device 177 are valid even in a heat storage type waste gas purification apparatus devoid of the bypass passages (31, 32, etc.). With reference to FIG. 12(b), an example of the heat storage type waste gas purification apparatus devoid of the bypass passages, as a modification of the heat storage type waste gas purification apparatus 171, will be described. That is, a heat storage type waste gas purification apparatus 191 illustrated in FIG. 12(b) has the same configuration as that of the apparatus 171 illustrated in FIG. 12(a), except that the apparatus 191 is devoid of the first and second bypass passages and the bypass on-off valves. In FIG. 12(b), the same element or component is assigned with the same reference sign as that in FIG. 12(a), and detailed description thereof will be omitted. The heat storage type waste gas purification apparatus 191 illustrated in FIG. 12(b) can realize to reduce exhaust noise of air cylinders 174 of supply and discharge on-off valves with higher efficiency.

What is claimed is:

1. A heat storage type waste gas purification apparatus comprising:

a combustion chamber configured to combust and decompose a component contained in waste gas;

a plurality of heat storage chambers each having one end communicating with the combustion chamber and each comprising a heat storage body;

a plurality of supply inlets each equipped with an on-off valve and each provided at the other end of a respective one of the heat storage chambers to selectively supply waste gas thereto;

a plurality of discharge outlets each equipped with an on-off valve and each provided at the other end of a respective one of the heat storage chambers to selectively discharge treated waste gas therefrom;

a discharge passage connected to the discharge outlets to discharge the treated waste gas to an outside of the apparatus therethrough;

a plurality of bypass passages each connecting between the combustion chamber and the discharge passage, each of the bypass passages being connected to the combustion chamber at a position directly above a respective one of the heat storage chambers, and equipped with an on-off valve; and a bypass passage control section operable, when a temperature of one of the heat storage chambers becomes equal to or greater than a given value, to open one or more of the on-off valves of the bypass passages so as to discharge a part of waste gas in the combustion chamber via the opened one or more bypass passages.

2. The heat storage type waste gas purification apparatus as defined in claim 1, wherein each of the bypass passages is connected to a top portion of the combustion chamber.

3. The heat storage type waste gas purification according to claim 1, wherein the heat storage chambers includes a first heat storage chamber and a second heat storage chamber adjacent to the first heat storage chamber, and wherein the heat storage type waste gas purification apparatus further comprises an agitation device provided in an internal space of the combustion chamber at a position between a region of the internal space just above the first heat storage chamber and a region of the internal space just above the second heat storage chamber, and configured to agitate waste gas in the combustion chamber.

4. The heat storage type waste gas purification apparatus according to claim 1, which further comprises:
a supply passage connected to the supply inlets;
a blower provided in the supply passage and configured to supply waste gas to the supply inlets;
a return passage connecting between the discharge passage and a region of the supply passage located upstream of the blower, to return treated waste gas in the discharge passage to the supply passage therethrough; and
a flow rate adjusting mechanism configured to adjust a flow rate of treated waste gas to be permitted to flow into the return passage.

5. The heat storage type waste gas purification apparatus according to claim 4, wherein the flow rate adjusting mechanism is a three-way valve provided in the discharge passage at a connection point with the return passage and configured to adjust a flow rate of treated waste gas to be permitted to flow from the discharge passage into the return passage.

6. The heat storage type waste gas purification apparatus according to claim 4, wherein the flow rate adjusting mechanism is an adjusting valve provided in the discharge passage at a downstream position with respect to a connection point with the return passage and configured to adjust a flow rate of treated waste gas to be permitted to flow through a region of the discharge passage downstream of the connection point to thereby adjust a flow rate of treated waste gas to be permitted to flow into the return passage.

7. The heat storage type waste gas purification apparatus according to claim 4, wherein the flow rate adjusting mechanism is an adjusting valve provided in the return passage and configured to adjust a flow rate of treated waste gas to be permitted to pass through the return passage.

8. The heat storage type waste gas purification apparatus according to claim 4, which further comprises:
a flow rate detection section configured to detect a flow rate of waste gas supplied from the blower toward the supply inlet; and
a flow rate adjusting mechanism control section operable, based on a result of the detection by the flow rate detection section, to control the flow rate adjusting mechanism to adjust a flow rate of treated waste gas to be permitted to flow into the return passage.

9. The heat storage type waste gas purification apparatus according to claim 4, which further comprises:
a pressure detection section configured to detect a pressure in the supply passage at a position downstream of a connecting position with the return passage and upstream of the blower; and
a flow rate adjusting mechanism control section operable, based on a result of the detection by the pressure detection section, to control the flow rate adjusting mechanism to adjust a flow rate of treated waste gas to be permitted to flow into the return passage.

10. The heat storage type waste gas purification apparatus according to claim 4, which further comprises:
a flow rate detection section configured to detect a flow rate of waste gas supplied from the blower toward the supply inlet;
a pressure detection section configured to detect a pressure in the supply passage at a position downstream of a connecting position with the return passage and upstream of the blower; and
a flow rate adjusting mechanism control section operable, based on results of the respective detections by the flow rate detection section and the pressure detection section, to control the flow rate adjusting mechanism to adjust a flow rate of treated waste gas to be permitted to flow into the return passage.

11. The heat storage type waste gas purification apparatus according to claim 4, wherein each of the on-off valves of the supply inlets and the on-off valves of the discharge outlets comprises:
a flow port-defining member formed with a flow port for waste gas to be supplied or discharged therethrough;
a valve element configured to be movable in directions causing the valve element to come close to and away from the flow port-defining member, in such a manner as to be brought into contact with the flow port-defining member to thereby close the flow port, and then separated from the flow port-defining member to thereby open the flow port; and
an air cylinder configured to drive the valve element in the directions causing the contact and the separation with respect to the flow port-defining member
and wherein the heat storage type waste gas purification apparatus further comprises a common silencer tank to which a plurality of exhaust lines each configured to exhaust driving air for a respective one of the air cylinders of the on-off valves of the supply inlets and the discharge outlets are connected in a merged manner, the silencer tank being disposed within a noise insulation device.

12. The heat storage type waste gas purification apparatus according to claim 11, wherein the noise insulation device is provided in such a manner as to surround the blower.

* * * * *